US008260917B1

(12) United States Patent
Manikowski et al.

(10) Patent No.: US 8,260,917 B1
(45) Date of Patent: Sep. 4, 2012

(54) SERVICE MANAGER FOR ADAPTIVE LOAD SHEDDING

(75) Inventors: Eric J. Manikowski, Atlanta, GA (US); Premkumar Venkatasamy, Cumming, GA (US); Kenneth M. Thompson, Dunwoody, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 954 days.

(21) Appl. No.: 11/264,080

(22) Filed: Nov. 1, 2005

Related U.S. Application Data

(60) Provisional application No. 60/630,920, filed on Nov. 24, 2004.

(51) Int. Cl.
*G06F 15/173* (2006.01)
(52) U.S. Cl. ............ 709/225; 709/203; 709/223
(58) Field of Classification Search .......... 709/203, 709/223, 225
See application file for complete search history.

(56) References Cited

U.S. PATENT DOCUMENTS

| 5,440,741 | A  | * | 8/1995  | Morales et al. .......... 718/103 |
|-----------|----|---|---------|----------------------------------|
| 6,298,478 | B1 |   | 10/2001 | Nally et al.                     |
| 6,615,253 | B1 |   | 9/2003  | Bowman-Amuah                     |
| 6,785,542 | B1 |   | 8/2004  | Blight et al.                    |
| 6,823,373 | B1 |   | 11/2004 | Pancha et al.                    |
| 6,947,943 | B2 |   | 9/2005  | DeAnna et al.                    |
| 6,959,456 | B2 |   | 9/2005  | Peng                             |
| 6,977,992 | B2 |   | 12/2005 | Zirngibl et al.                  |
| 6,983,200 | B2 |   | 1/2006  | Bodin et al.                     |
| 6,985,905 | B2 |   | 1/2006  | Prompt et al.                    |
| 7,477,657 | B1 | * | 1/2009  | Murphy et al. ............ 370/468 |
| 2002/0169867 | A1 | * | 11/2002 | Mann et al. ............... 709/224 |
| 2003/0217164 | A1 | * | 11/2003 | Cai et al. ................. 709/229 |
| 2003/0233465 | A1 |   | 12/2003 | Le Vui et al.                    |
| 2004/0215817 | A1 | * | 10/2004 | Qing et al. ............... 709/238 |
| 2005/0027851 | A1 | * | 2/2005  | McKeown et al. .......... 709/224 |
| 2005/0102400 | A1 | * | 5/2005  | Nakahara et al. .......... 709/225 |
| 2005/0114541 | A1 | * | 5/2005  | Ghetie et al. ............ 709/232 |
| 2005/0165932 | A1 | * | 7/2005  | Banerjee et al. .......... 709/226 |
| 2006/0053478 | A1 | * | 3/2006  | Horman et al. ............ 726/1  |

OTHER PUBLICATIONS

Zinky et al. Complementary Methods for QoS Adaptaion in Component-based Multi-Agent Systems, 2004, pp. 108-117, retrieved from http://ieeexplore.ieee.org/stamp/stamp.jsp?arnumber=1368424 &isnumber=29953 on Nov. 7, 2008.*
Shim, Richard, "WiMax in the Wings," (Jun. 25, 2004). Available at ZDNet News Online, http://news.zdnet.com/2100-9584_22-5247964.html. Last accessed Feb. 16, 2006.
"What .NET Means for IT Professionals," (Jul. 24, 2002). Available at http://www.microsoft.com/net/business/It_pros.asp. Last accessed Feb. 16, 2006.

* cited by examiner

*Primary Examiner* — Kenny Lin
(74) *Attorney, Agent, or Firm* — Turocy & Watson, LLP

(57) ABSTRACT

A service manager that facilitates managing requests that are obtained at a middleware tier of a communications network includes a monitor component that evaluates data associated with effectuating a request that is received at a middleware tier. The monitor component identifies resources associated with effectuating the request. Additionally, the service manager includes a request component that accepts and/or rejects the request based at least in part upon the identified resources.

40 Claims, 15 Drawing Sheets

SERVICE MANAGER FOR ADAPTIVE LOAD SHEDDING

CROSS-REFERENCE TO RELATED APPLICATIONS

This application claims the benefit of U.S. Provisional Patent application Ser. No. 60/630,920 entitled "SYSTEMS AND METHODS FOR PROVIDING A SERVICE MANAGER FOR ADAPTIVE LOAD SHEDDING" and filed Nov. 24, 2004, the entirety of which is incorporated by reference herein.

TECHNICAL FIELD

The subject innovation relates to services provided by a wireless telecommunication carrier, and more specifically, to monitoring and/or controlling requests at a middleware tier to mitigate resource starvation and/or catastrophic failure.

BACKGROUND

The mobile telephone industry has been associated with tremendous growth over the last several years. For instance, in the recent past, mobile telephones were only available to those of highest economic status due to service costs and costs associated with mobile phones. Moreover, network coverage was not extensive enough to enable robust service. In particular, only areas associated with dense population were provided with extensive wireless network coverage. Still further, the mobile phones that could utilize the networks to communicate were quite bulky, causing portation of the phone over any significant distance to be difficult at best. In more detail, antennas associated with these phones could be over a foot in length, thus making it difficult to utilize the phones in automobiles or other congested areas.

In contrast, today's portable phones (and other portable devices) can be utilized as full-service computing mechanisms. For example, many of the most recent and advanced mobile phones can be associated with word processing software, accounting software, and various other types of software. Furthermore, network coverage has expanded to cover millions, if not billions, of users. Additionally, mobile phones have decreased in both size and cost. Specifically, modern mobile phones are often small enough to slip into an individual's pocket without discomforting the individual. Furthermore, many mobile network service providers offer phones at extremely low cost to customers who contract for service with such providers.

The increase in the number of mobile users has yielded increased network traffic associated with wireless telecommunication carriers' backend services and/or systems. By way of illustration, backend services, such as a billing system, can be provided by a wireless telecommunication carrier to various clients including customer care call centers, retail stores, payment systems, etc. Typically, the clients can communicate with the backend via a middle tier that can broker data transmission between the clients and the backend system(s) and/or service(s). However, use of such a middle tier can slow network traffic and/or cause failure of the entire system due at least in part to limited numbers of middle tier resources.

For example, a middleware tier can receive and/or transmit requests for several backend services from disparate backends. Oftentimes, services from one or more backends can become slow and/or unresponsive which can cause middleware resources to be occupied until the backend services recover. During this time, requests for responsive backend services can be starved of middleware resources. By way of illustration, all middleware resources can be allocated to unresponsive requests and request queues can fill, which can cause middleware applications to become completely unavailable for further processing.

Services can be associated with disparate markets such that each of the disparate markets can utilize physical instances of the backend system(s) and/or service(s). Traffic can generally flow from a front end system to a backend related to a particular market and then return to the front end, or vice versa. Backend billing system outages, which can be limited to a single market, can produce middleware resource starvation and catastrophic failure, often within five to ten minutes of the backend outage. Conventional techniques that utilize rolling bounces to clear the congestion can yield loss of all requests and oftentimes only temporarily purged the backlog.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The claimed subject matter described herein relates to evaluating and/or controlling requests that are received at a middleware tier in a communications network. Requests can be obtained from a source such as, for example, a front end system and the middleware tier can communicate the request to a backend to which the request is directed. A service manager can be associated with the middleware tier and can mitigate tier-wide outages that arise when a subset of services in an n-tier architecture fail and/or are unresponsive. For example, the service manager can monitor backend responsiveness and reject requests that will not meet established performance criteria and/or that may negatively impact overall application operation. The service manager can include a monitor component that can identify required resources and/or obtain accurate resource availability information. The service manager can utilize this information to accept and/or reject the requests.

According to an aspect, a service manager can mitigate resource starvation (e.g., in a multi-threaded, shared resource software system). The service manager can monitor system performance characterized by resource utilization and can reject new requests when it is determined that required resources are unavailable and/or operate outside of acceptable performance bounds. The service manager can be associated with any client/server component that can rely upon outside resources to fulfill client requests. Pursuant to an example, the service manager can be deployed in connection with a J2EE EJB container and/or can be implemented in Java. Moreover, the service manager can utilize direct application information with observed environment information to mitigate resource starvation leading to application and/or system failures.

Pursuant to additional aspects, a request can be received at a middleware tier and an application can call a service manager that examines the request by evaluating the data of the request. For example, a backend associated with the request can be identified by the service manager. Additionally or alternatively, the service manager can determine resources currently being employed in connection with the backend and/or disparate backends. The service manager can also accept and/or reject the request based on the identified information.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

Figure 1:
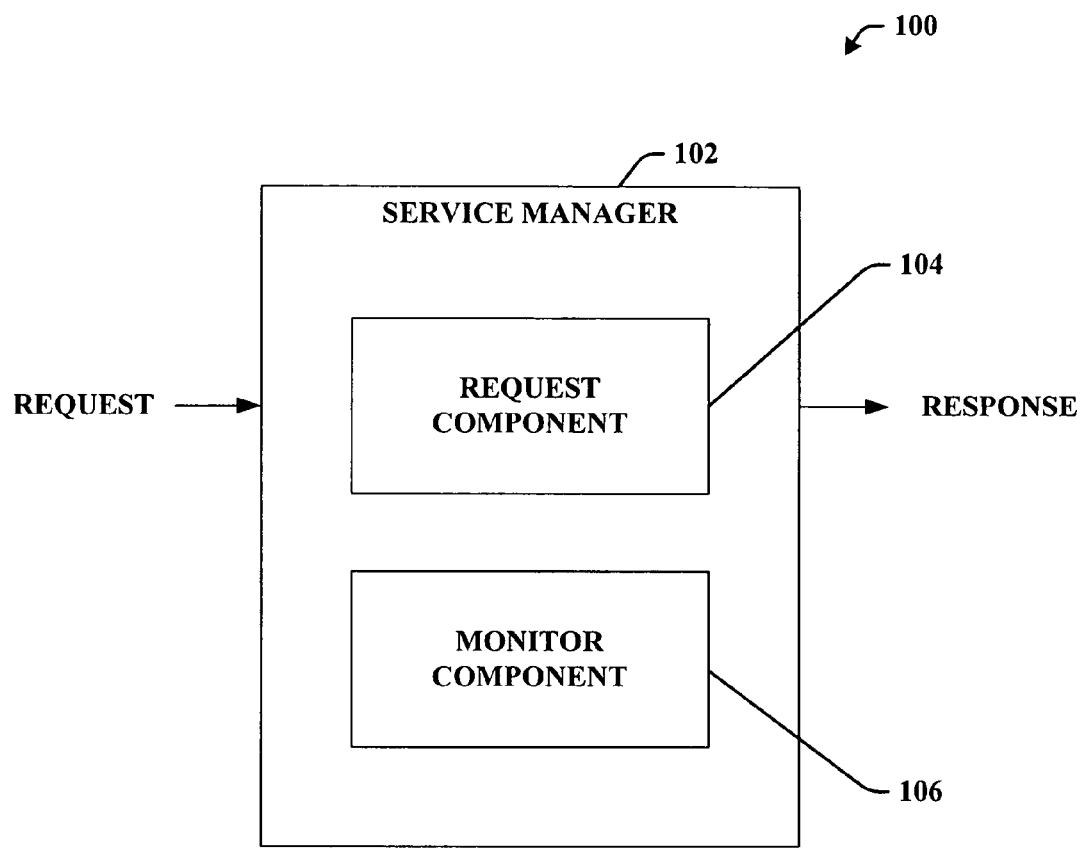
FIG. 1 illustrates a system that facilitates managing requests that are received at a middleware tier.

Appendix A illustrates exemplary pseudo code that can be utilized in connection with various aspects—this appendix is to be considered part of the specification of the subject application.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "manager," and "evaluator" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that facilitates managing requests that are received at a middleware tier. The requests can be obtained from a front end system (e.g., client), a backend (e.g., billing system), etc. Additionally, the requests can be directed towards a backend, front end system, etc. (e.g., transmitted as a response). Pursuant to an example, traffic can flow from a front end system to particular backend through the middleware tier, and then return to the front end system; however, the claimed subject matter is not so limited. The communication of data between the front end(s) and the backend(s) can be controlled by middleware. The system 100 includes a service manager 102 that facilitates monitoring backend responsiveness and/or rejecting requests that may fail to meet established performance criteria and/or negatively impact overall network operation. The service manager 102 can be associated with a middleware tier that services various client and backend systems, for instance; however, the service manager 102 is not limited to use with a middleware tier and can be employed in any computing environment that supports synchronous transactions. The service manager 102 can include a request component 104 that can accept and/or reject a request. A request that is known and/or anticipated to fail can be rejected without harming a requesting client; also, such a rejection can mitigate harm to disparate clients. Pursuant to an example, the request component 104 can reject a request upon receipt, provide a response to the source of the request, and thereby reduce an amount of time that a requesting client waits for a response. In contrast, without utilizing the request component 104 (and/or the service manager 102 in general), the requesting client would typically wait for a timeout period (e.g., thirty seconds) to expire prior to receiving a response when resources are lacking.

The service manager 102 can also include a monitor component 106 that can identify required resources and/or obtain accurate resource availability information. For example, the monitor component 106 can evaluate an incoming request and determine resources that are typically utilized to effectuate such request. Additionally, the monitor component 106 can identify current resources being utilized. For example, the monitor component 106 can determine a number of requests for a particular service, a number of requests associated with a middleware container, a responsiveness of a backend, resources currently associated with a particular service, resources currently associated with a middleware container, etc. The information generated with the monitor component 106 can be employed by the request component 104 to effectuate accepting and/or rejecting requests to produce a proper response.

The service manager 102 can provide a number of advantages over conventional techniques. In particular, the service manager 102 can mitigate catastrophic system failures caused by limited backend failures. For example, the service manager 102 can mitigate tier-wide outages caused when a subset of services in an n-tier architecture fail and/or become unresponsive. The failure can result from resource allocation granularity in Java 2 Platform, Enterprise Edition (J2EE) containers and associated resource starvation. These containers can allocate managed resources based on an Enterprise Java-Bean (EJB) type rather than the data processed by an EJB, and the containers typically do not provide an API for a developer to adequately control allocation and/or retrieval of container-managed resources.

Further, application-specific definitions of monitored resources can be provided by the service manager 102. Additionally, the service manager 102 can provide configurable limits on resource requests. Moreover, the service manager 102 can enable online monitoring, provide detailed information for system wide fault isolation, allow selective resource on and off control, utilize a minimal memory footprint and low execution overhead, and consume little or no managed resources.

Pursuant to an example, the service manager 102 can control container resource allocation indirectly by controlling application demands for these resources. Application developers can employ the service manager 102 to regulate resource loading utilizing data driven criteria with a finer granularity than offered by frameworks and containers. Further, rejecting requests for overloaded backend services can prevent resource starvation and/or catastrophic failure, thus improving an end user's experience by mitigating waiting time.

Figure 2:
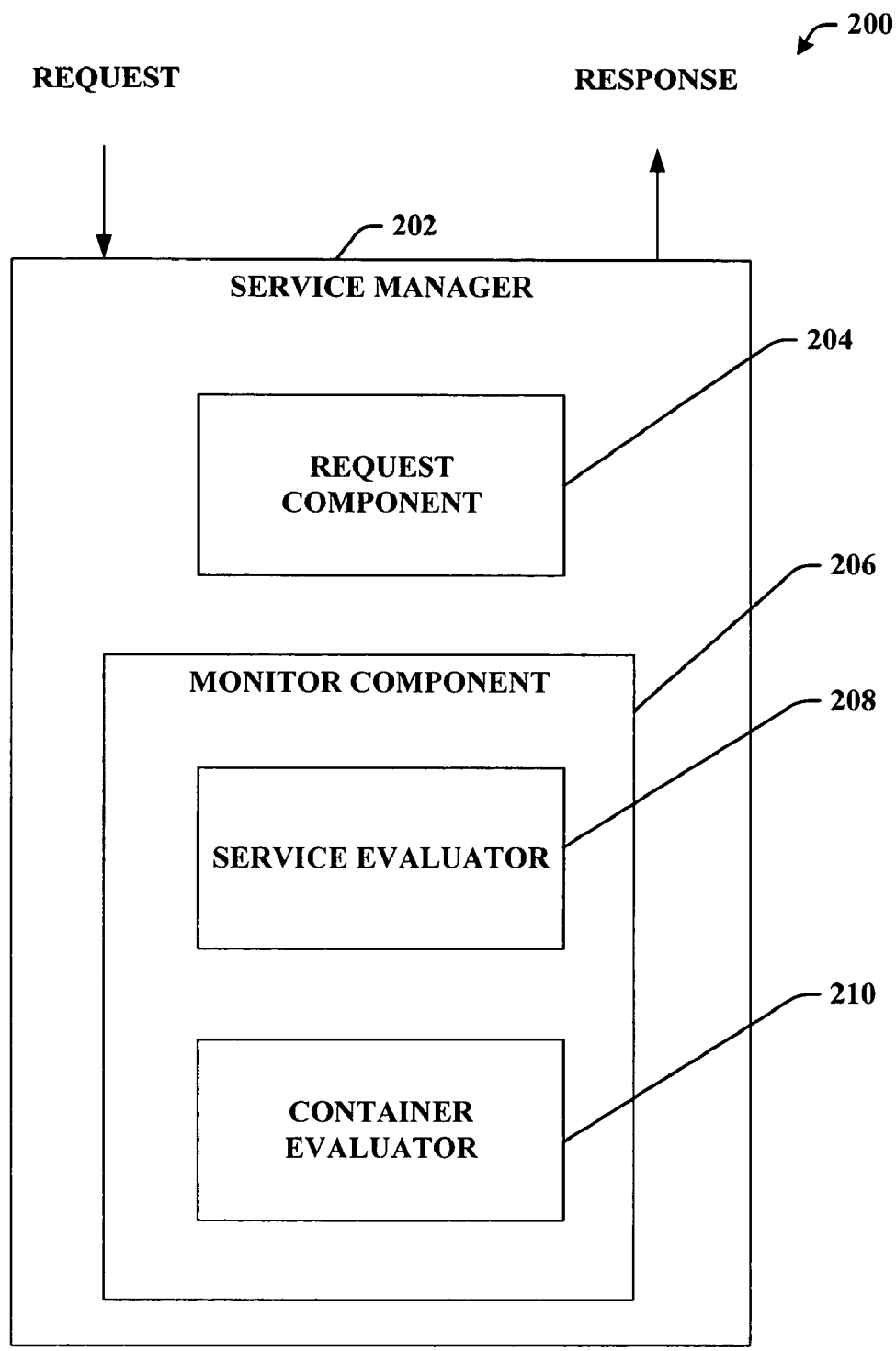
FIG. 2 illustrates a system that facilitates monitoring and/or managing requests associated with service(s) and/or container(s) that are provided to a middleware tier.

With reference to FIG. 2, illustrated is a system 200 that facilitates monitoring and/or managing requests associated with service(s) and/or container(s) that are provided to a middleware tier. The system 200 includes a service manager 202 that can receive a request and/or provide a response based on resources associated with effectuating the request and/or resource availability. The service manager 202 can include a request component 204 that accepts and/or rejects a request that is received. The service manager 202 also can include a monitor component 206 that evaluates the received request and/or resource availability.

The monitor component 206 can include a service evaluator 208 that facilitates determining whether to accept and/or reject a request for a particular service. The service evaluator 208 can control an amount of resources consumed by a particular backend service. For example, the service evaluator 208 can be associated with a threshold for a maximum number of requests for a particular service that can be executing and/or waiting for a response. The threshold can be a predetermined amount and/or an amount that varies depending on available resources, a current number of requests (e.g., for a particular backend, for a particular service, for an entire container, . . . ), backend responsiveness, etc. The service evaluator 208 can identify a particular service associated with a request that is received (e.g., a string of letters identifying a particular service can be included in data associated with the received request, an interface can specify service level requirements, . . . ). Further, the service evaluator 208 can identify resources that are associated with effectuating the requested service. Additionally, the resources currently being employed in connection with the service (e.g., disparate requests for the same service) can be determined with the service evaluator 208. Pursuant to an additional illustration, the service evaluator 208 can facilitate controlling a number of requests from a client that are concurrently processed. According to this illustration, the client (or a source of requests) can be considered to be a service, and thus, the service evaluator 208 can determine a current number of requests, a response time for requests made from a particular client, etc. to protect middleware and/or backend resources from being consumed by a single client and/or being blocked by requests specific to a particular client.

The monitor component 206 can also include a container evaluator 210 that assesses available resources associated with a container. By way of example, the container can be a J2EE container that can deploy units of application functionality implemented as EJBs. The container evaluator 210 can determine a number of requests that are executing and/or waiting for a response associated with the container. Further, the container evaluator 210 can compare the number of requests that are executing and/or waiting for a response to a threshold value for the container such that if the incoming request would cause the number of requests that are executing and/or waiting for responses to exceed the threshold value, the request can be denied (e.g., providing an immediate response via the request component 204 denying the request).

Figure 3:
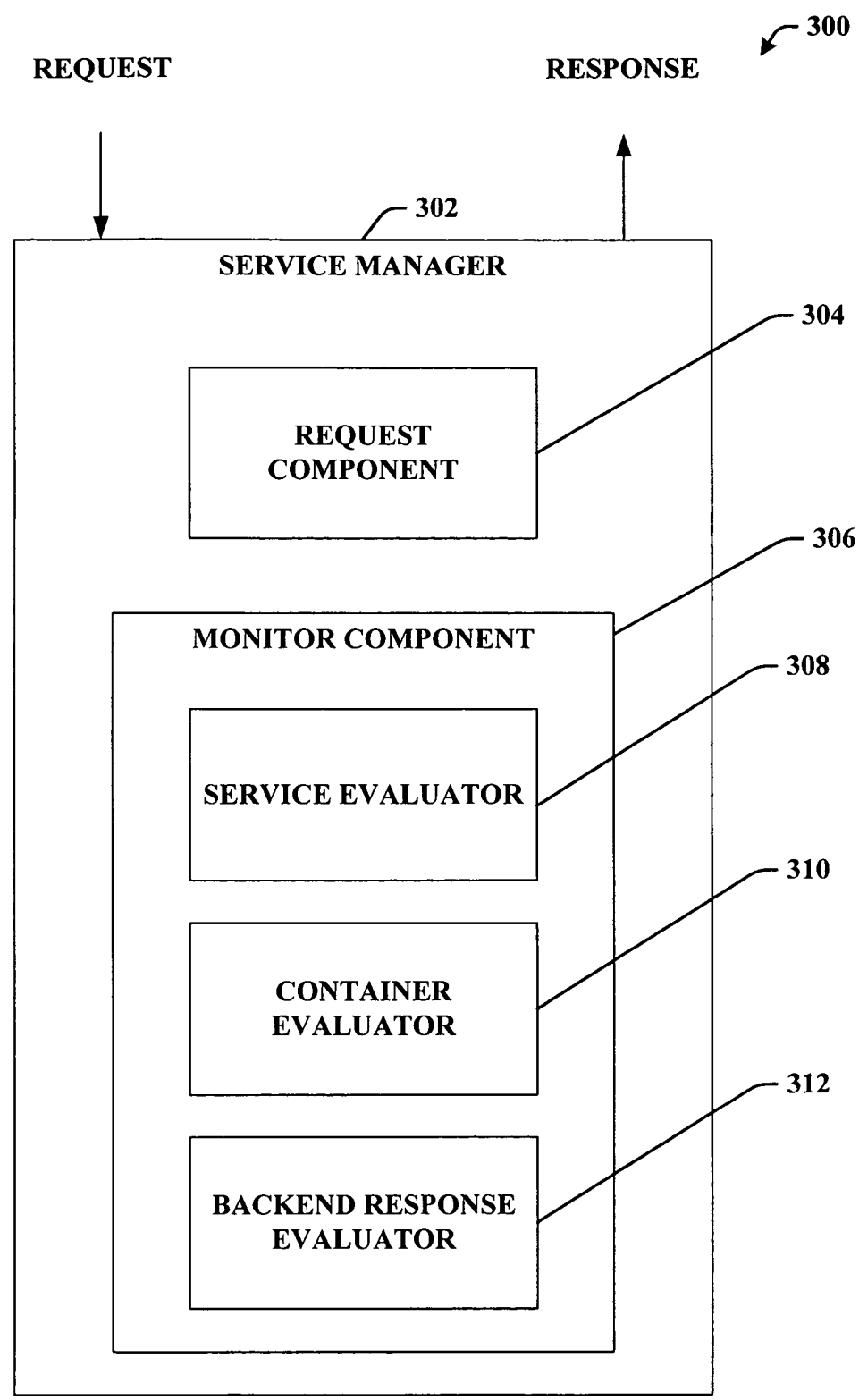
FIG. 3 illustrates a system that facilitates managing requests that traverse through a middleware tier via utilizing a response of a backend.

Referring to FIG. 3, illustrated is a system 300 that facilitates managing requests that traverse through a middleware tier via utilizing a response of a backend. The system 300 includes a service manager 302 that monitors and/or controls requests that are received. The service manager 302 can include a request component 304 that can accept and/or deny a received request. For instance, the request component 304 can provide an immediate response back to a sender (e.g., front end, backend, . . . ) of a request notifying the sender that the request has been denied. Thus, the sender of the request need not wait for a timeout period to expire prior to receiving a notification that a request has failed.

The service manager 304 can also include a monitor component 306 that examines data associated with a request, resources typically employed to effectuate the request, and/or available middleware resources. The monitor component 306 can include a service evaluator 308 that can identify a service associated with a particular request, resources associated with enabling such a request, and/or resources presently being employed with the service (e.g., executing and/or waiting for a response). The monitor component 306 can also include a container evaluator 310 that can evaluate current resource usage for an entire container (e.g., compare a number of requests being executed and/or waiting for a response to a threshold for the container). Further, the monitor component 306 can include a backend response evaluator 312 that can differentiate between a service that is responding slowly and a large volume of requests for a particular service. For example, if a spike in volume of requests for a particular service exists, the backend response evaluator 312 identifies this current condition and enables accepting the request. For instance, if a service is responding within a particular threshold of time, that particular service can be provided within additional resources (e.g., bandwidth, threads, connections, . . . ). Pursuant to another illustration, if a backend is responding slowly to requests, the backend response evaluator 312 can facilitate denying additional requests for the particular service and thus enable the middleware resources to be utilized in connection with disparate services.

Figure 4:
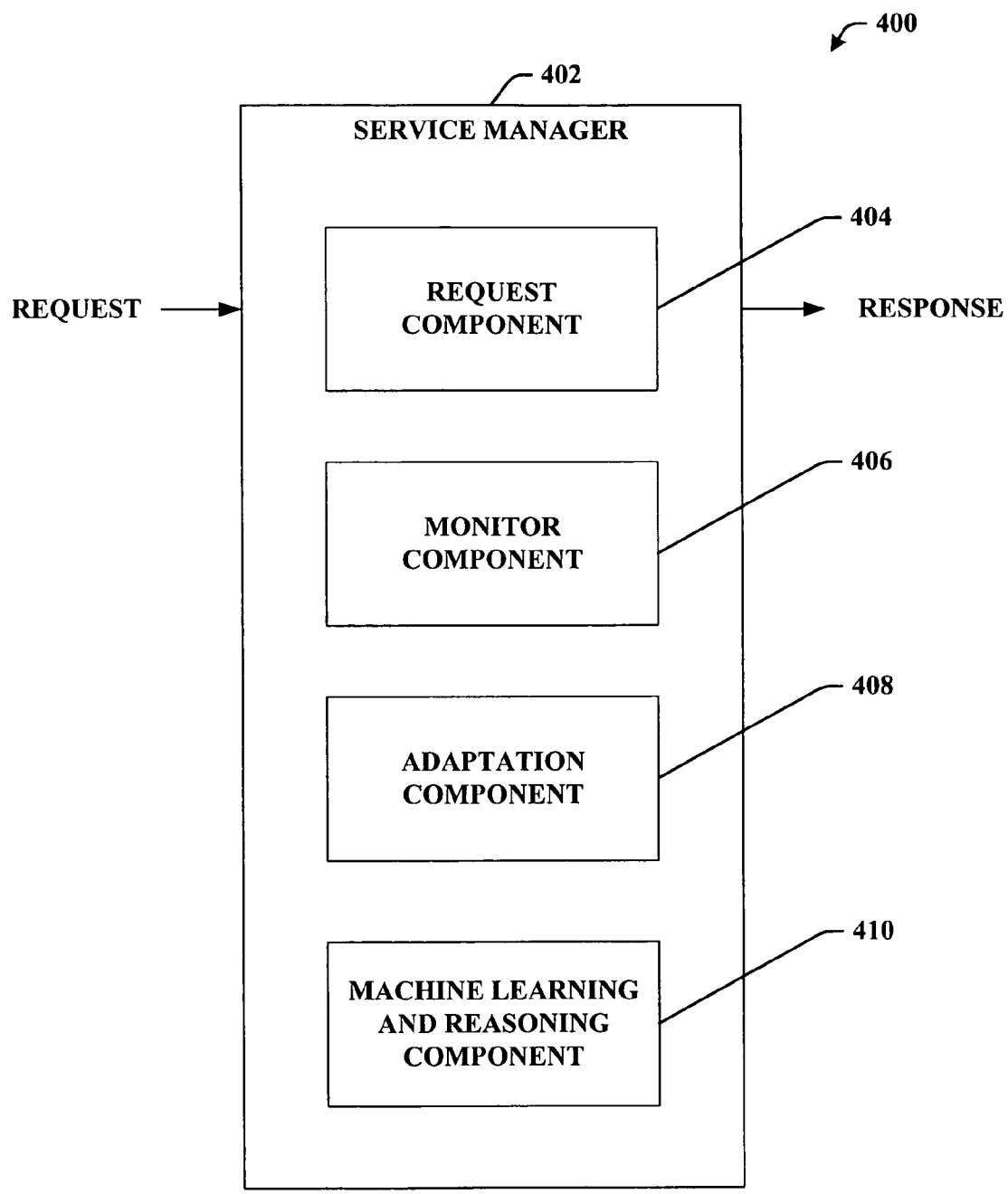
FIG. 4 illustrates a system that enables adaptive monitoring and/or control of requests that are received and/or transmitted utilizing resources associated with a middleware tier.

With reference to FIG. 4, illustrated is a system 400 that enables adaptive monitoring and/or control of requests that are received and/or transmitted utilizing resources associated with a middleware tier. The system 400 includes a service manager 402 that receives a request (e.g., from a front end system, backend, . . . ) that can be communicated employing resources associated with the middleware tier. The service manager 402 can include a request component 404 that accepts and/or rejects requests that are received. By way of example, the request component 404 can reject a request that is likely to fail and thereafter notify a provider of the request of such rejection. According to another illustration, the request component 404 can accept a request that is received and provide a response to the service and/or system to which the request is directed. Pursuant to this illustration, the request component 404 can enable reformatting the request, addressing the request to direct it to the recipient location (e.g., backend system, backend service, front end, . . . ), encrypting/decrypting data associated with the request, etc. to provide a response associated with the request. The response can thereafter be executed, queued, etc. The service manager 402 additionally can include a monitor component 406 that can analyze the received request and/or conditions associated with middleware resources. For example, the service manager 402 can identify a backend service and/or system to which a request is directed, resources that are typically utilized to effectuate such a request, resources currently being employing in connection with the backend service and/or system, and/or resources being utilized by a middleware container.

The service manager 402 can additionally include an adaptation component 408 that facilitates varying a number of requests that are associated with a particular service and/or system (e.g., modifying an associated threshold). For example, the monitor component 406 can identify that a number of requests received by the service manager 402 associated with a particular backend service, executing and/or waiting for responses from the particular backend service exceeds a threshold value (e.g., via employing the service evaluator 308). According to this illustration, the monitor component 406 can also determine that the backend is responding slowly to requests (e.g., via utilizing the backend response evaluator 312); thus, the adaptation component 408 can reduce the threshold value associated with the particular backend service and/or system to free middleware resources for use with disparate backend services and/or systems. Pursuant to another example, the monitor component 406 can identify an increase in volume of requests to a particular backend service and/or system coupled with normal operation of the backend service and/or system (e.g., via utilizing the backend response evaluator 312). Thereafter, the adaptation component 408 can enable increasing the threshold for the maximum number of requests that can concurrently be executing and/or waiting for a response for the backend service and/or system.

The service manager can further include a machine learning and reasoning (MLR) component 410 which facilitates automating one or more features in accordance with the subject innovation. Various artificial intelligence-based schemes can be employed for carrying out various aspects. For example, a process for determining available services, allocation of resources between services, and/or behavior of services over time can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine is an example of a classifier that can be employed. The support vector machine operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions. For example, based upon a particular time of day, the MLR component 410 can identify how to allocate resources to different services (e.g., taking into account a number of requests commonly initiated during each time period). In another example, the MLR component 410 can learn that a new service is associated with a received request. Accordingly, the MLR component 410 can identify a format for data associated with the new service, a location of the new service, etc. Further, the MLR component 410 can evaluate previous request failures and/or successes to determine whether a received request is likely to fail and/or succeed. These are only but a few examples of the capabilities that can be provided by the use of the MLR component 410.

Figure 5:
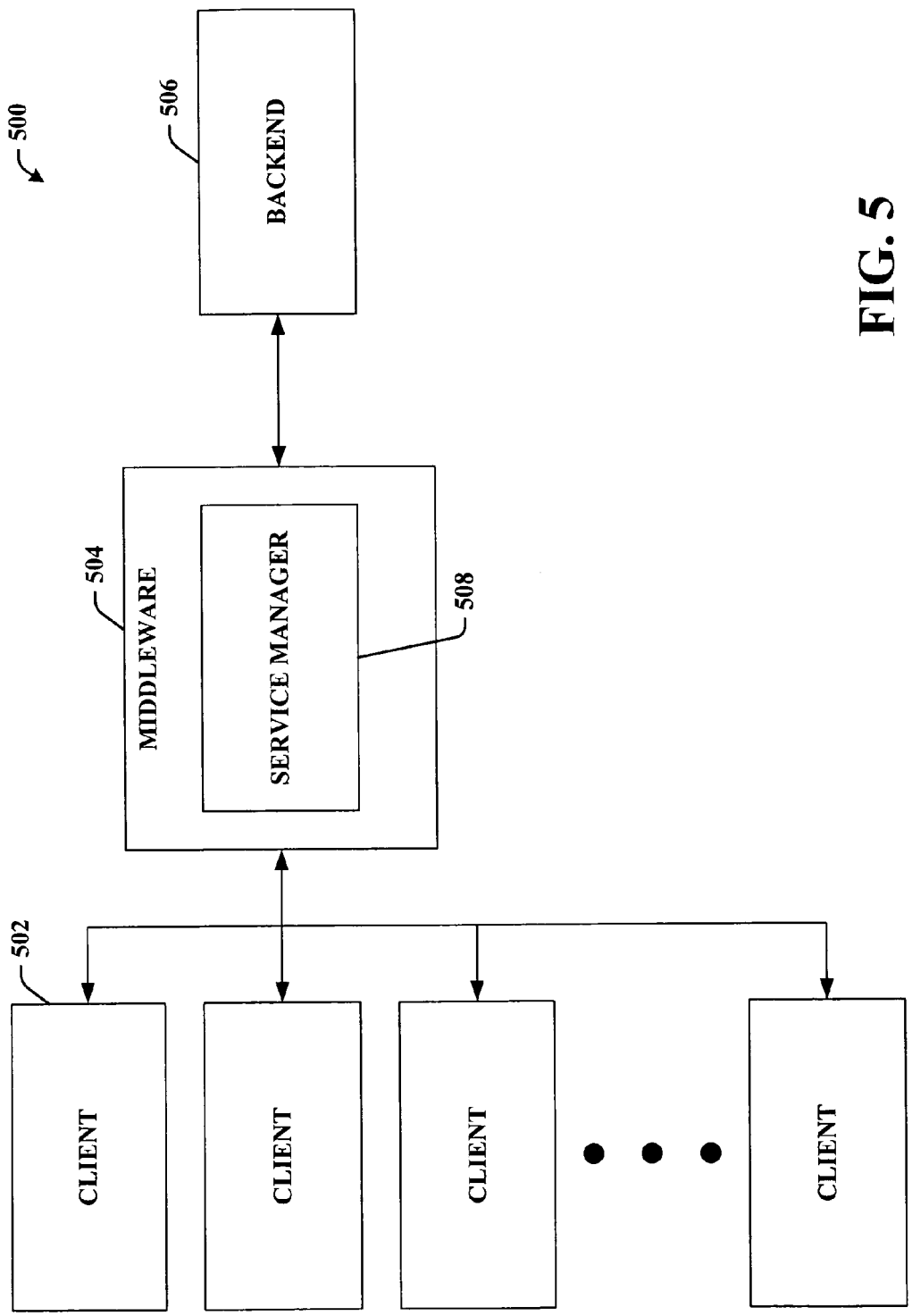
FIG. 5 illustrates a system that mitigates tier wide outages that can result when a subset of services fail or become unresponsive.

Turning to FIG. 5, illustrated is a system 500 that mitigates tier wide outages that can result when a subset of services fail or become unresponsive. The system 500 can include N clients 502, where N is any positive integer. The clients 502 can be, for example, retail systems, customer care call centers, billing services, payment systems, etc. It is to be appreciated that the clients 502 can all be of a similar type (e.g., retail systems, customer care call center, billing services, payment systems, . . . ), disparate types, or a combination thereof. Each of the clients 502 can send requests to middleware 504. Further, the requests can be directed to a backend 506 (e.g., backend service, backend system, . . . ). The middleware 504 can be associated with various resources that enable directing and/or communicating the data of the request to the appropriate backend 506. For example, a number of backends can exist in addition to the backend 506. Thus, the middleware 504 can enable communicating the request in a protocol associated with the backend 506. Additionally, the middleware 504 can transmit the request to the backend 506. It is to be appreciated that the backend 506 can be a legacy system and/or service and/or a modern system and/or service; however, the claimed subject matter is not so limited.

The middleware 504 can include a service manager 508 that can evaluate the data associated with the requests received by the middleware 504. For instance, the service manager 508 can identify resources that are associated with a particular request and/or resources that are currently being employed to execute disparate requests and/or waiting for a response associated with disparate requests. The service manager 508 can effectuate accepting and/or denying requests that are received by the middleware 504. If the request is likely to fail, the service manager 508 can immediately respond to the client 502 that sent the request indicating that the request failed. Additionally or alternatively, the service manager 508 can enable normal processing to occur if resources are available and/or the request is not likely to fail.

Figure 6:
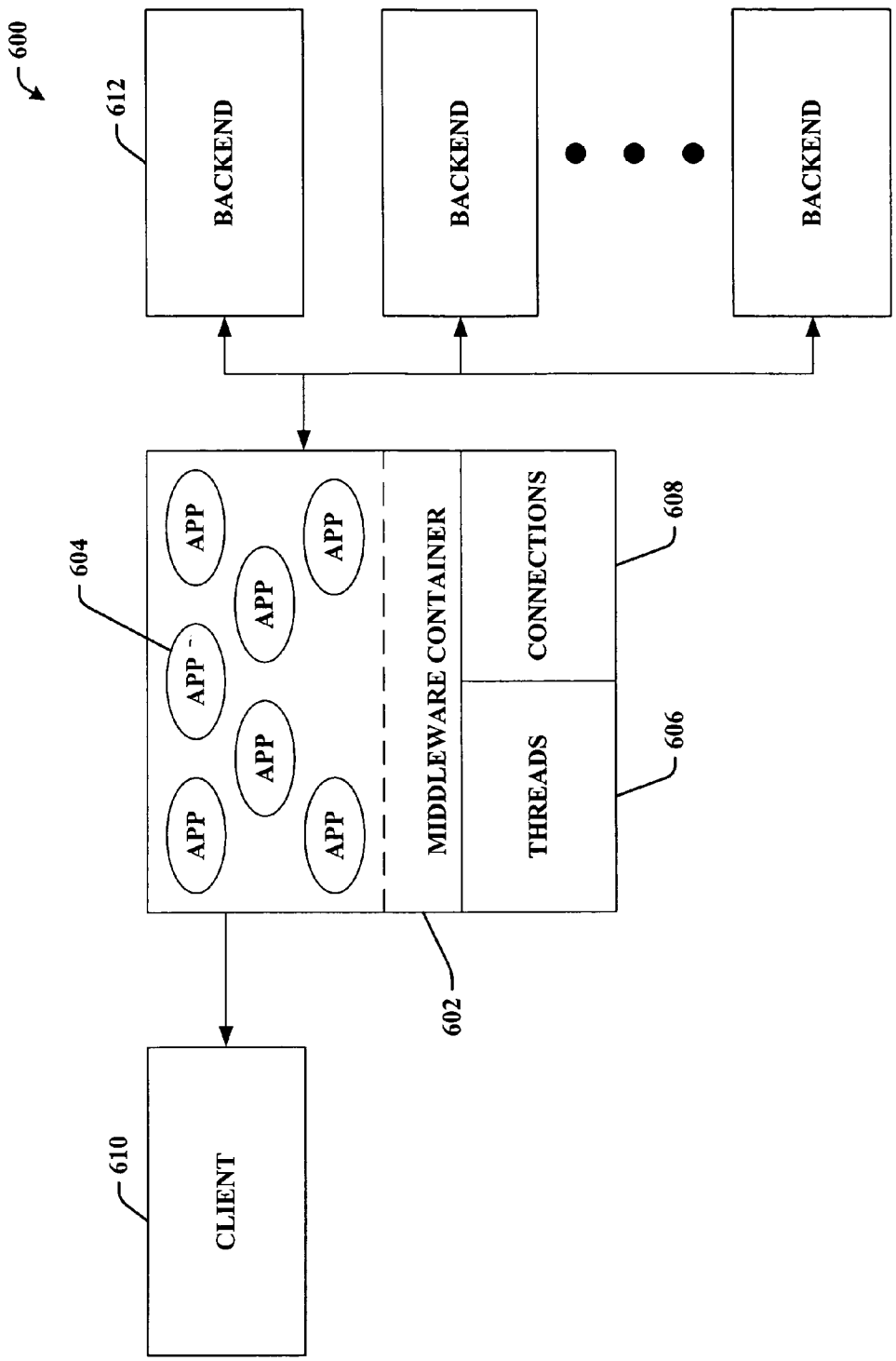
FIG. 6 illustrates an exemplary container environment that can be employed in connection with various aspects associated with the claimed subject matter.

With reference to FIG. 6, illustrated is an exemplary container environment 600 that can be employed in connection with various aspects associated with the claimed subject matter. The environment 600 can include a middleware container 602; for instance, the middleware container 602 can be a J2EE container. The middleware container 602 can include M applications 604, where M is a positive integer. Each of the applications 604 can have a specific function (e.g., customer lookup). Additionally, a one or more of the applications 604 can be an Enterprise JavaBean (EJB). The middleware container 602 can additionally include any number of threads 606 and/or any number of connections 608. The middleware container 602 can manage all of these resources. The middleware container 602 can reside upon a single machine, can be spread over disparate hardware, can be located at diverse geographic locations, etc. By way of illustration, a middleware tier that services various client and backend systems can run on eight clusters in two disparate cities, and each of the clusters can include four machines; however, the claimed subject matter is not so limited to this example. Further, the environment 600 is horizontally scalable by adding more containers and/or the environment 600 can add additional functionality by incorporating more applications 604. Although not depicted, it is to be appreciated that a service manager (e.g., service manager 102, . . . ) can be employed in connection with the middleware container 602 to enable monitoring and/or controlling resources.

According to an example, a client 610 can access an EJB (e.g., application 604) by connecting to the container 602 (e.g., cluster) where the EJB is deployed. The container 602 can initialize a copy of the EJB and allocate resources such as threads 606 to the EJB instance. Multiple instances of the same EBJ (e.g., application 604) can simultaneously process different requests for different clients (e.g., client 610 and disparate clients (not shown)). When resources are unavailable, the client request can be queued. If the queue fills, the client request can be rejected.

Often, an EJB uses subsets of backend services (e.g., associated with particular ones of X backends 612, where X is any positive integer), which can be determined by data in the client request. When requests are evenly distributed, an unresponsive backend service can accumulate requests in various states of processing and occupy resources until limits associated with the container 602 are reached and thus, yield rejection of requests. The resulting container resource starvation can prevent otherwise responsive requests from processing.

A conventional EJB-only solution relates to creating a separate EJB for each backend service. Since most containers allow allocation limits for each EJB type, this can allow operation personnel to set limits at deployment or during run-time that can prevent resource starvation. However, these limits also mitigate benefits associated with resource sharing of a container, increase operational complexity, and expose backend 612 architecture to the client 610. It is to be appreciated that each of the backends 612 can be a legacy backend, a modern backend, etc.

Figure 7:
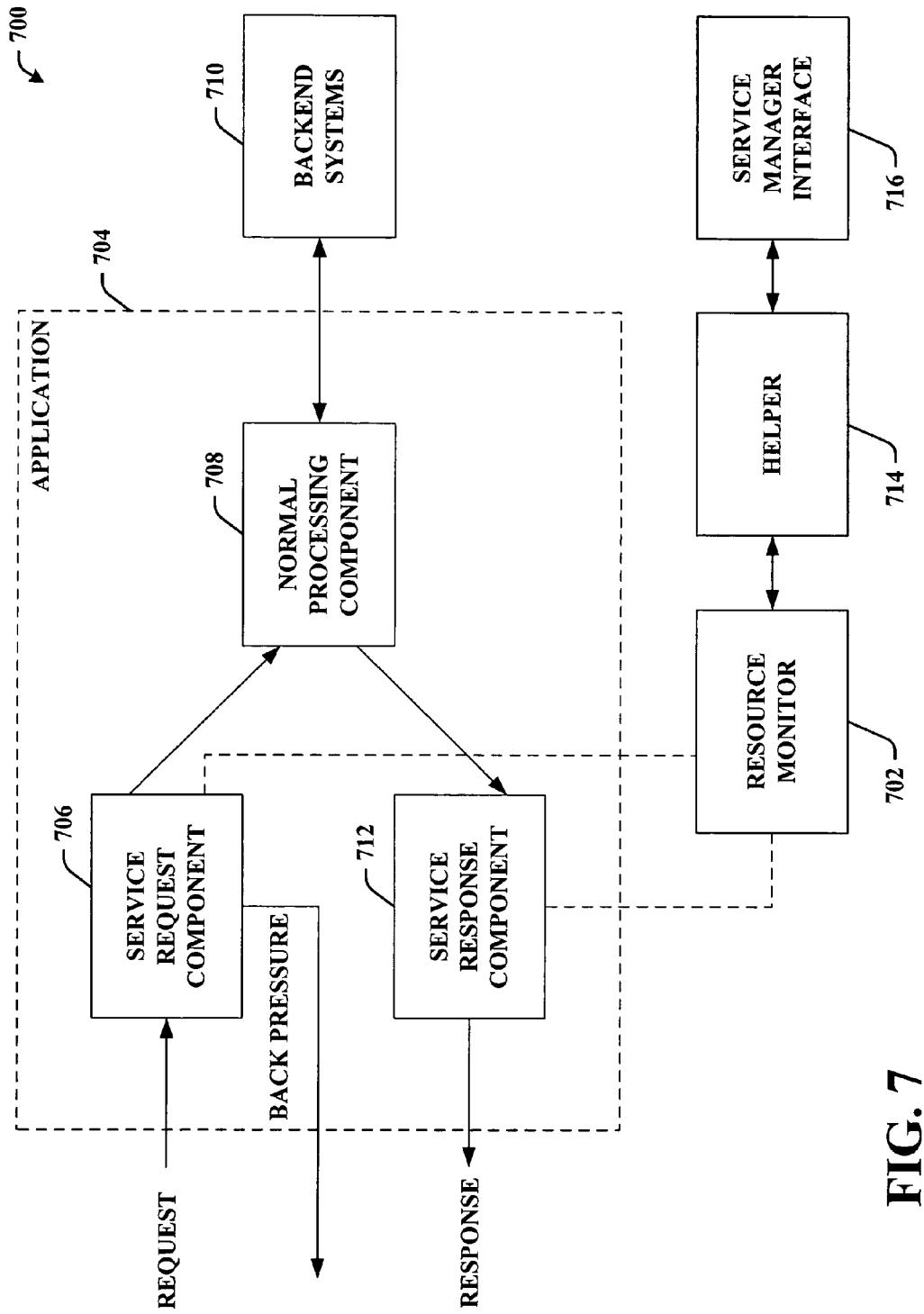
FIG. 7 illustrates a system that evaluates and/or controls middle tier resource utilization.

With reference to FIG. 7, illustrated is a system 700 that evaluates and/or controls middle tier resource utilization. A resource monitor 702 can be associated with an application 704, which can identify required resources and/or obtain accurate resource availability information. Based on this information, a client request received at a service request component 706 can be accepted (predicted success) or rejected (predicted failure). If the request is rejected, back pressure can be employed to allow a client to respond immediately rather than timing out or waiting for an inevitable failure. Thus, client resource utilization and/or an end user experience can be improved. Accordingly, backend failures are isolated to requests for particular services and system wide failures are mitigated. If the request is accepted at the service request component 706 (e.g., number of requests does not exceed a threshold for a particular service or for a container), then the request is provided to the normal processing component 708. At that time, the resource monitor 702 determines the number of services that are currently being executed and/or that are waiting for a response from backend systems 710 and adds one to that number. Additionally, the normal processing component 708 calls the backend system 710 associated with the received request and waits for a response. When processing is complete, the normal processing component 708 provides data associated with the request to a service response component 712, which can provide a response to the client. Additionally, upon receipt of the data, the service response component 712 can decrement the number of requests currently being employed by utilizing the resource monitor 702.

The resource monitor 702 (and a service manager in general) need not interact with a container (not shown) and is not restricted to use within containers. The container environment (e.g., from FIG. 6) and/or resources managed by the container need not be manipulated. Since client requests can be rejected on the basis of backend responsiveness, starvation of all container resources, not just threads, can be mitigated.

A service manager can include the resource monitor 702, APIs that can be called by the application 704, a helper 714 that facilitates control, and a service manager interface 716 (e.g., graphical user interface (GUI) and/or command line interface (CLI)). The service manager can be deployed in a telecommunication carrier's middleware EJB tier that services various client and/or backend systems. For instance, the middleware tier can service customer billing transactions; however, the claimed subject matter is not so limited. This tier can provide an extensible markup language (XML) interface to the carrier's billing systems as well as other billing related systems (e.g., backend systems 710). The middleware tier can be deployed as a clustered, replicated (multiple clusters) application presenting a single EJB to clients. Clients can invoke a single API against a single bean with the request operation and parameters conveyed in the request XML. From this XML request it is possible to determine specific backend resources needed to complete the request. It is to be appreciated that the service manager is not limited to utilization in connection with a telecommunication carrier's middleware tier; for example, the service manager may be employed in any computing environment supporting synchronous transactions. The service manager is not limited to utilization by telecommunication carriers, being deployed in Java, or being employed in association with a middleware tier.

The primary classification of requests can be based on the billing system. The primary classification can further be classified by market within a billing system. The backend systems 710 can follow this taxonomy with dramatically different architectures between various billing systems (especially where two or more billing systems are being used by a carrier) and separate resources allocated to individual markets or groups of markets. In the case where two billing systems are being used, since requests for both of the billing systems and all markets flow through the same cluster, it is possible for a single unresponsive billing system or market to consume all middleware resources. Clients making synchronous requests can also suffer from resource starvation. Conventional techniques that employ rolling bounces result in loss of all work-in-progress and often do little more than clear the system for inevitable recongestion and failure.

The resource monitor 702 can track resource utilization and/or responsiveness, and can implement a request rejection policy. Resources can be tracked using resource identifier objects. The mapping of these identifiers with backend resources may reside in the application domain and may obscure the backend architecture from the client.

The request rejection policy can balance the need for maximum system throughput against the risk that over-allocating to a single resource ID may be the precursor to system failure. All resource level requests can be handled by a single resource monitor 702. Accordingly, a single point of control can be presented to system operators.

Any number of current requests per service and/or any amount of processing time before a service is considered to be slow can be employed in accordance with the claimed subject matter. The request limit can be malleable, and may be exceeded. While one or a few services may dominate, these services will not be permitted to completely starve all other services. This maximizes use of processing resources while maintaining failure prevention.

A number of parameters are adjustable. In particular, the following can be modified: a maximum number of concurrent requests per service; a maximum total number of requests per Java Virtual Machine (JVM); a time limit for maximum concurrent service requests to hang before rejecting new requests; and a maximum number of hung requests per service before rejecting requests.

According to an illustration, the following exemplary pseudo code can be employed in connection with the service manager.

```
try {ServiceRequest svcReq=
ServiceManager.getServiceRequest(svcNm);
//
//perform application operation here . . .
//}
catch (ServiceManagerException e) {
// . . . }
finally {ServiceManager.freeServiceRequest(svcReq);}
```

Accordingly, getServiceRequest( ) can be a static service manager method returning a ServiceRequest for the associated service name. If the requested service is unavailable, this method throws an exception. ServiceRequest can be the service manager object used to track an individual service allocation. Additionally, freeServiceRequest( ) can return the allocated ServiceRequest to the service manager. Failure to properly free allocated ServiceRequest objects can result in leakage. Further, ServiceManagerException can be an exception thrown when a requested service is unavailable and/or unresponsive.

Service manager can be utilized in the application 704. The backend services (e.g., associated with backend systems 710) can be analyzed and service identifiers can be mapped. Once the services are identified, the service may be mapped to the client requests and a facility may be created to generate the identifiers from the client request input.

The application code can be modified so the code processing client request may be fully enclosed by the two service manager API calls. Application processing that relies on multiple backend services can make a separate getServiceRequest( )(and an associated freeServiceRequest( ) call for each resource. Additionally, various aspects of the resource monitor 702 can be controlled by a properties file (e.g., exemplary pseudo code associated with ServiceManagerConfig is included in Appendix A).

Resource descriptors can be employed; these resource descriptors can be strings that map specific client requests to a backend service. These services can be those identified as prone to failures, which can include specific markets and services, for example, a one-time, automated recurring payment processing system, a service that provides a mapping of a mobile phone number to a market utilized to route requests from client systems (e.g., point of sale, online account management, . . . ) to an appropriate billing system and/or market, etc. Even though some services can be provided by the same backend, service manager mitigates grouped failures from becoming catastrophic. This can result in a configuration that works well even if the backend organization changes. The resource descriptors can provide the following: selected request arguments can directly relate to backend services (e.g., market); separate ServiceRequest(s) can be utilized to avoid combining services into a single name; and service identifiers can be descriptive and meaningful for operation.

The helper 714 can provide access to the service manager for administration and management. In an EJB environment these can be an MBean conforming to the Java Management Extensions Application Program Interface (JMX API), and in a socket server it can be a listener on a port separate from the primary service socket.

The helper 714 (or a plurality of helpers) can execute in the same Java Virtual Machine (JVM) as the service manager enhanced application and access the service manager for monitoring and/or controlling a number of static methods. For example, the helper 714 can determine a current state including services marked as unavailable, a number of services currently in use and a total number of services used by an instance. According to another illustration, the helper 714 can set the availability of all known services, specified services, etc. Further, the helper 714 can obtain a map of current services and their associated states. Pursuant to other examples, the helper 714 can determine if a specified service is available, determine if the service manager is currently enabled or disabled, and/or set the service manager state to enabled or disabled.

Requests to MBeans in specific instances in a cluster can come from within the cluster. Per instance visibility can utilize a proxy bean that runs under the MBeanServer of a server. An administrator can allocate separate resources (e.g., threads) to the JMX beans to avoid situations where the MBeans acquire too many resources and so a system under stress does not lose access to the MBeans.

According to an example, the helper 714 can be a socket server helper. The socket server can run the helper 714 in a separate thread in the same JVM and can listen on a control port separate from a main service port. Pursuant to an example, a staged event-driven architecture (SEDA) can be employed in connection with a socket server helper.

Figure 8:
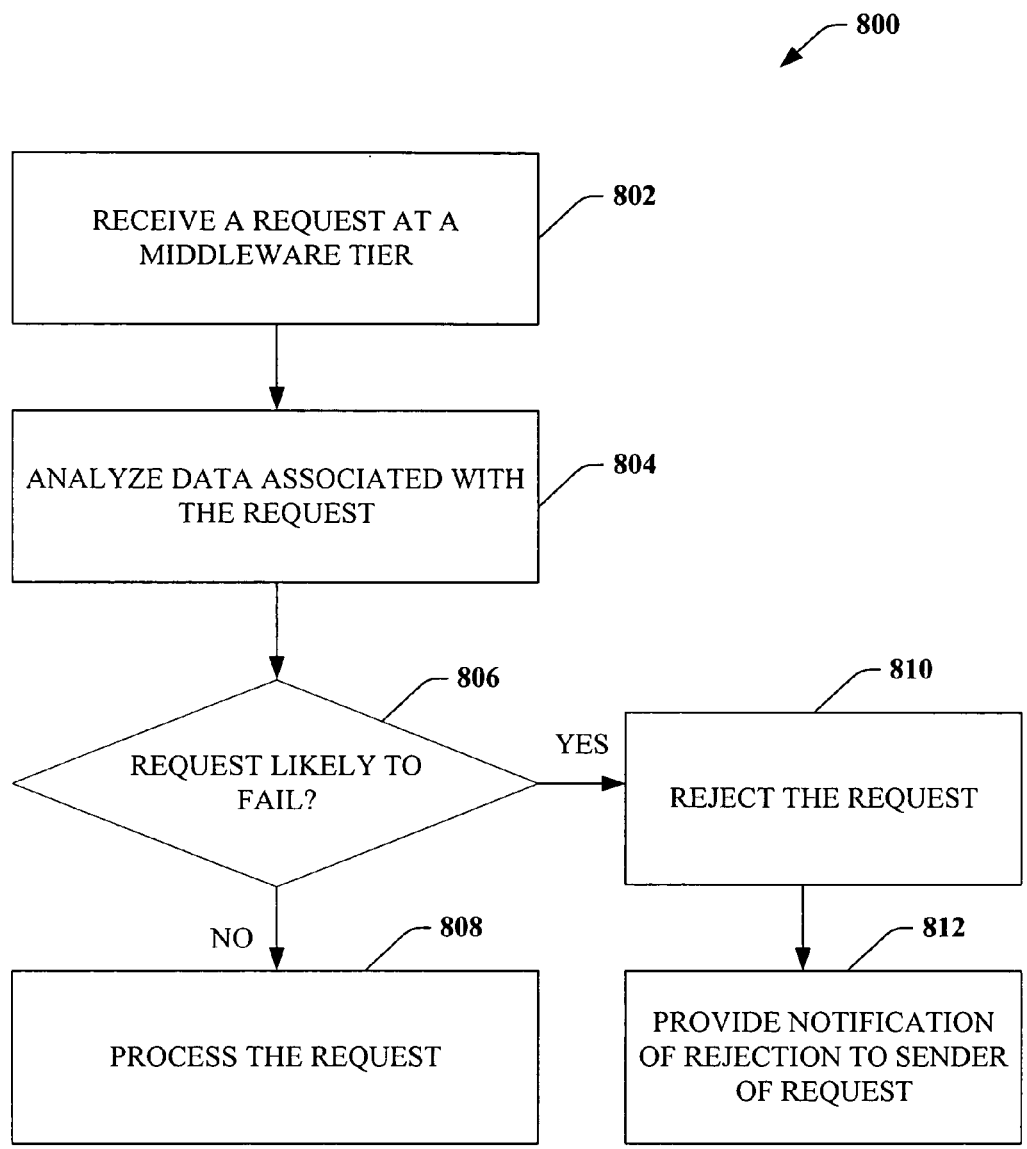
FIG. 8 illustrates a methodology that facilitates evaluating and/or controlling requests at a middleware tier.
Figure 9:
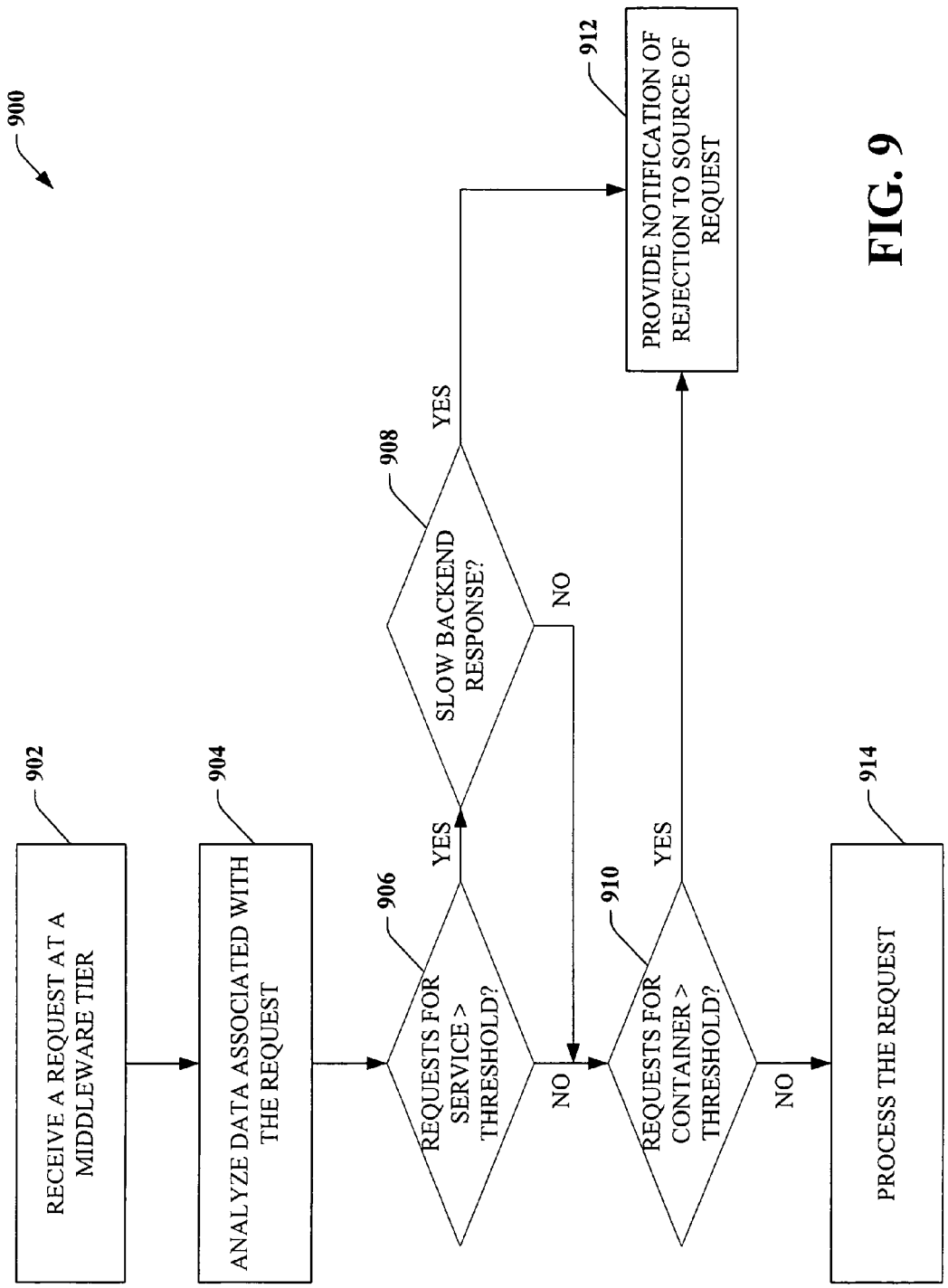
FIG. 9 illustrates a methodology that facilitates monitoring conditions associated with service(s) and/or container(s) to enable controlling requests at a middleware tier.
Figure 10:
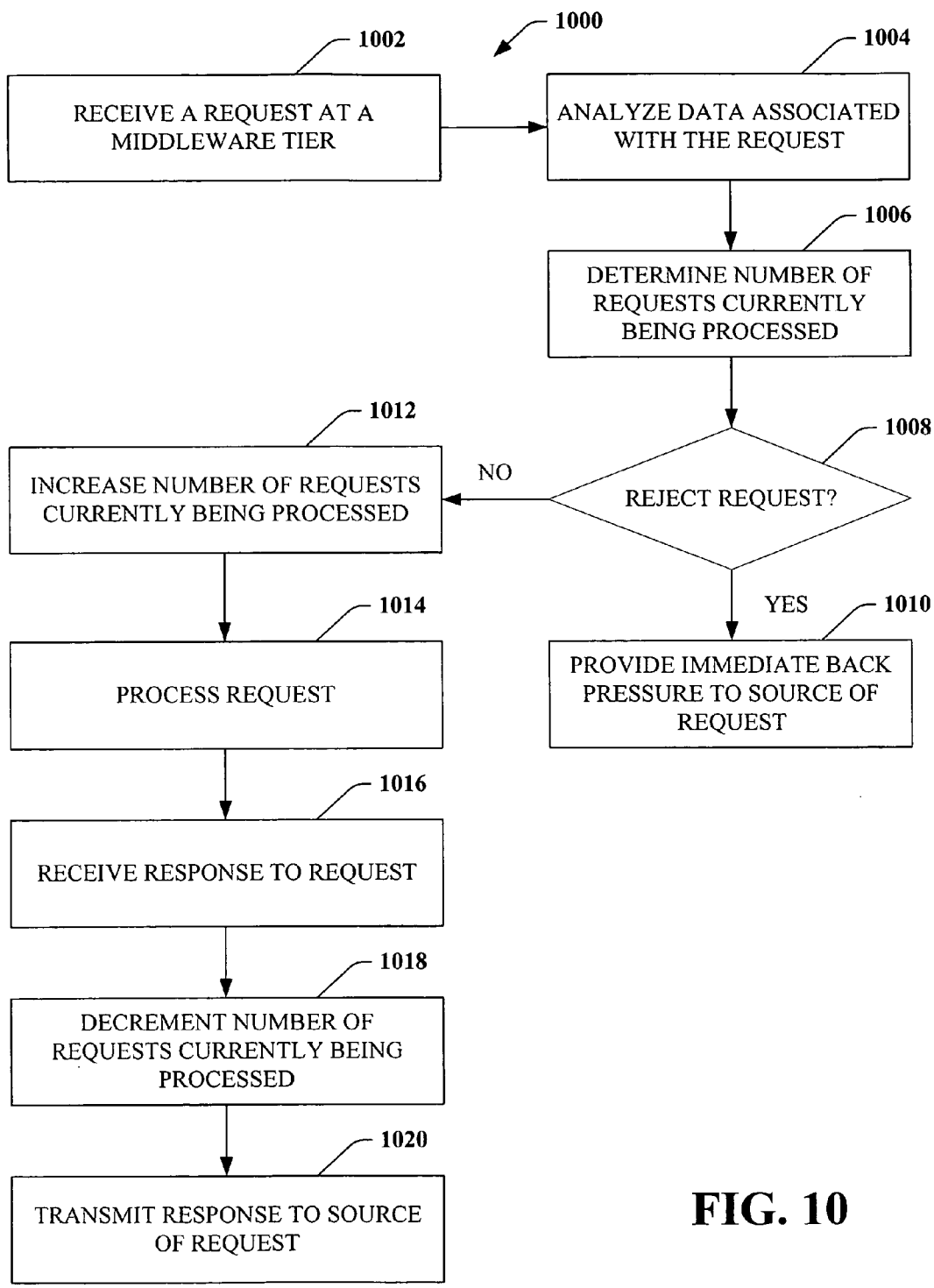
FIG. 10 illustrates a methodology that facilitates monitoring and/or controlling requests received at a middleware tier.

Referring to FIGS. 8-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 8, illustrated is a methodology 800 that facilitates evaluating and/or controlling requests at a middleware tier. At 802, a request is received at a middleware tier. For instance, the request can be obtained from a client and can be directed to a backend system and/or service; however, the claimed subject matter is not so limited. At 804, data associated with the request is analyzed. By way of example, the request can be evaluated to identify a particular backend system and/or server that is associated with the request. Additionally or alternatively, the request can be analyzed to determine resources that are related to effectuating the request. Pursuant to a further illustration, the request can be analyzed to determine a source of the request, and the source can be designated as a service that is subject to a service manager in a manner similar to any other service. At 806, a determination is made as to whether a request is likely to fail. This determination can be made, for example, by comparing a number of requests currently executing and/or waiting for a response to a threshold value (e.g., for a particular service, for a container, . . . ). Backend responsiveness can also be considered when making this determination. If it is determined that the request will likely succeed, the request is processed at 808 (e.g., transmitted to an appropriate backend, . . . ). If it is determined that the request will likely fail, the request is rejected at 810. At 812, notification of the rejection can be provided to the sender of the request. For instance, the notification can be provided to the sender without requiring the sender to wait for a timeout period to expire.

With reference to FIG. 9, illustrated is a methodology 900 that facilitates monitoring conditions associated with service(s) and/or container(s) to enable controlling requests at a middleware tier. At 902, a request is received at a middleware tier. The request can be provided by a client, a backend, etc. and can be directed to a particular backend, client, etc. At 904, the data associated with the request can be analyzed. By way of example, the identity of the source and/or the identity of the recipient (e.g., client, backend service and/or system) of the request can be identified via analyzing the data. At 906, a determination is made as to whether the number of requests for the identified service that are currently executing and/or waiting for a response, including the received request, exceeds a threshold. The threshold can be a static or dynamic value. Additionally, the threshold can be predetermined and/or modified as requests are processed. If the number of requests is greater than the threshold, a determination can be made at 908 as to whether the backend is responding slowly and/or whether there is a spike in volume for the service. If the number of requests for the service does not exceed the threshold as determined at 906 or if the backend is not responding slowly as determined at 908, then the number of requests associated with a particular container is compared to a threshold for the container at 910. If the number of requests for the container exceeds the threshold at 910 (or if the backend is responding slowly as determined at 908), then a notification is provided to the source of the request indicating that the request has been rejected at 912. If the number of requests for the container does not exceed the threshold at 910, then the request is processed at 914.

With reference to FIG. 10, illustrated is a methodology 1000 that facilitates monitoring and/or controlling requests received at a middleware tier. At 1002, a request is received at a middleware tier. At 1004, data associated with the received request is analyzed. The analysis of the data can indicate, for instance, that data is associated with a particular recipient (e.g., backend service, backend system, client, . . . ). At 1006, a number of requests currently being processed (e.g., executing and/or waiting for a response) is determined. At 1008, a determination is made as to whether to reject the received request. The determination can be based, at least in part, upon the number of requests currently being processed (e.g., for a particular service, for a container, . . . ). If the request is rejected, back pressure is immediately provided to the source of the request at 1010. If the request is not rejected, the number of requests currently being processed is increased (e.g., by one) at 1012. At 1014, the request is processed; for instance, the request can be transmitted to the intended recipient, encrypted, decrypted, properly routed and/or addressed, formatted according to a protocol associated with the recipient, etc. At 1016, a response to the request is received. At 1018, the number of requests currently being processed can be decremented (e.g., by one). At 1020, a response to the request can be transmitted to the source of the request.

Figure 11:
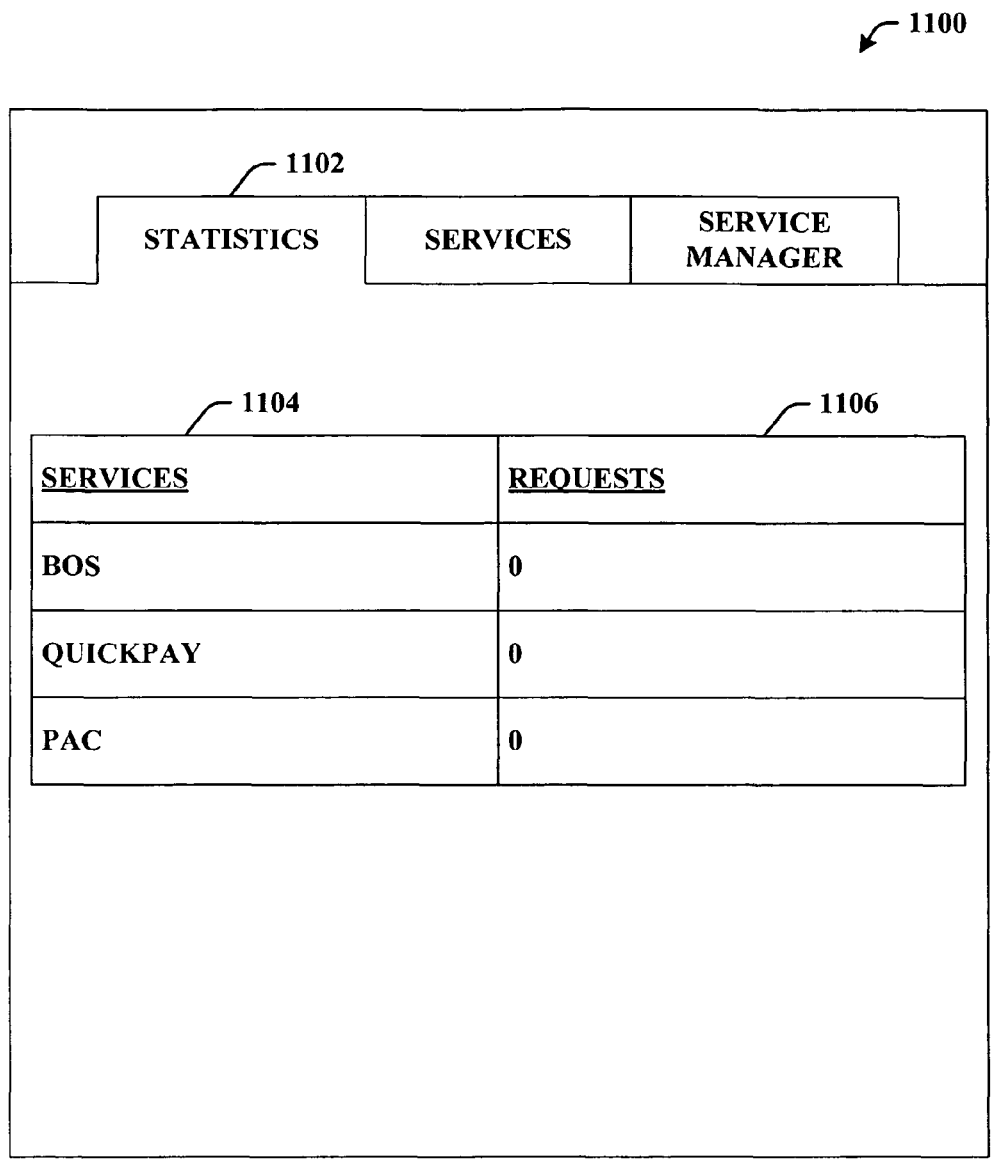
FIGS. 11-13 illustrate exemplary screenshots depicting various aspects associated with a service manager.
Figure 12:
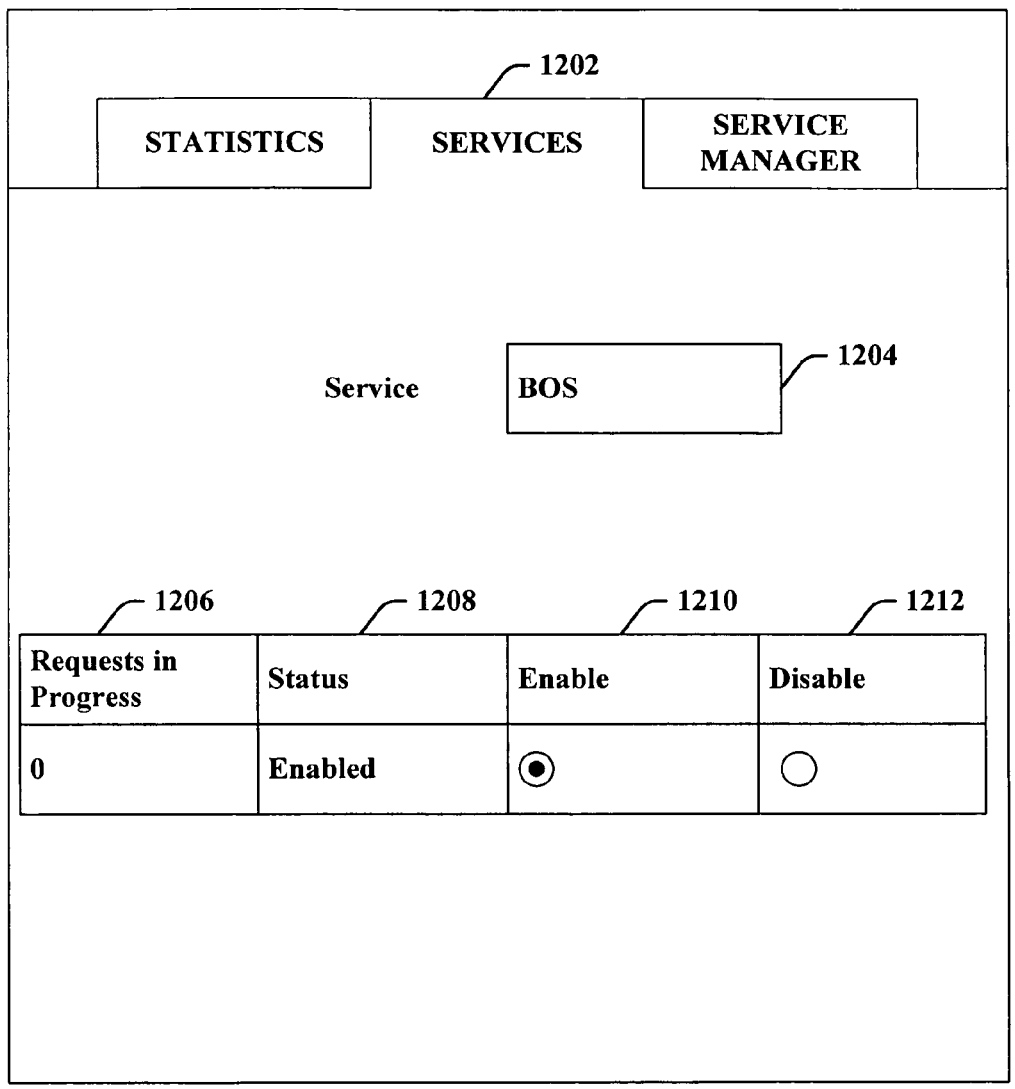
Figure 13:
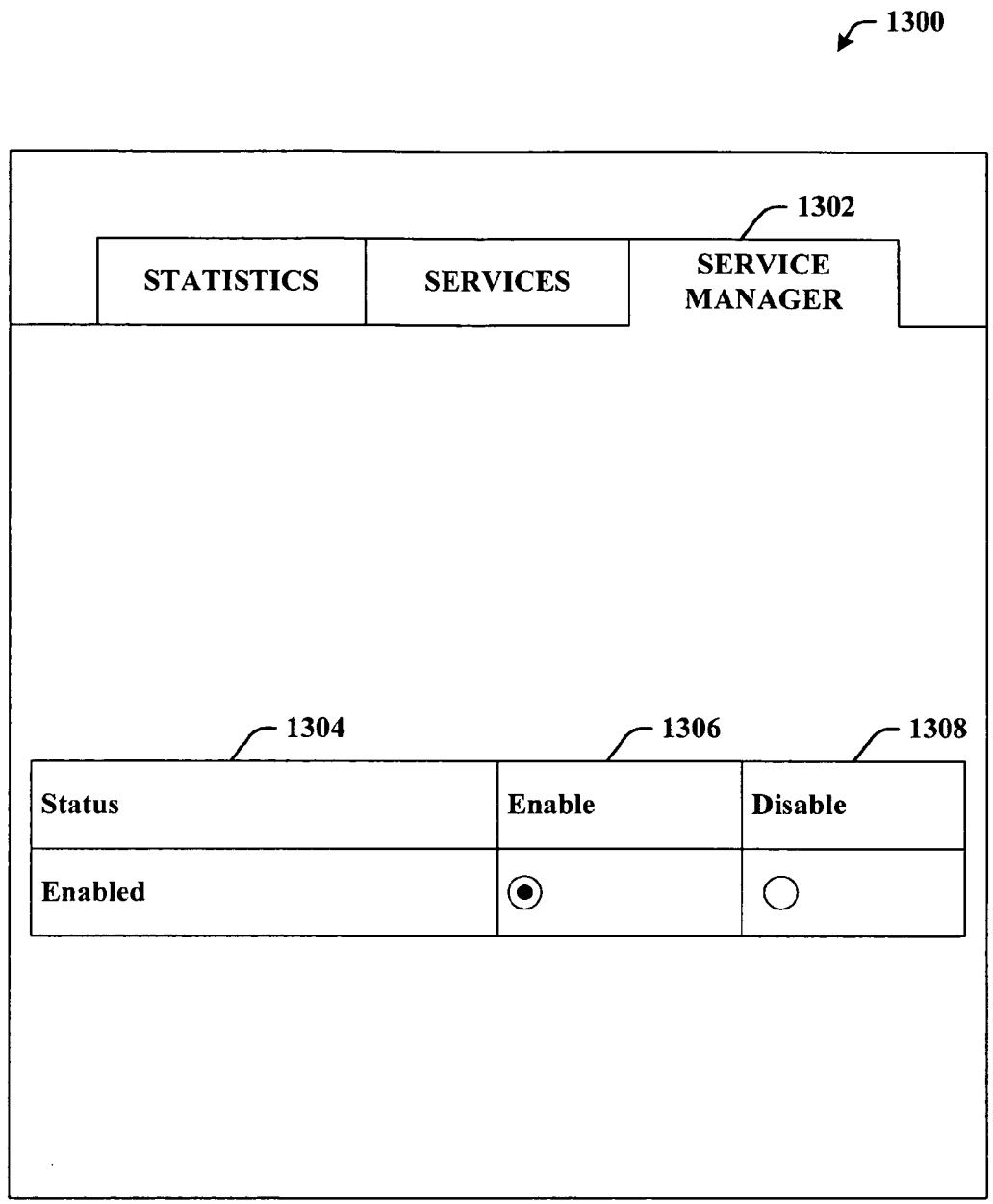

Referring to FIGS. 11-13, illustrated are exemplary screenshots depicting various aspects associated with a service manager. These screenshots are provided as examples and it is to be appreciated that the claimed subject matter is not limited to these examples. Turning to FIG. 11, illustrated is an exemplary screenshot 1100 that depicts a selected statistics tab 1102. Displayed is a list of services 1104 and corresponding numbers of requests 1106 currently in process for each of the services. In general, a high number of requests in process can indicate a backend problem associated with a particular service.

With reference to FIG. 12, illustrated is an exemplary screenshot 1200 where a services tab 1202 has been selected. A specific service 1204 can be entered (e.g., by a user via employing a keyboard, . . . ). Statistics associated with the service can be displayed. For example, the number of requests in progress 1206 and a current status 1208 of the service can be shown. Additionally, a user can select whether to enable and/or disable the particular service (e.g., via utilizing enable button 1210 and/or disable button 1212).

FIG. 13 illustrates an exemplary screenshot 1300 that depicts a selected service manager tab 1302. A current status 1304 can be displayed such as, for example, that the service manager is enabled, disabled, etc. Additionally, a user can be permitted to change the status of the service manager (e.g., via employing enable button 1306 and/or disable button 1308).

Figure 14:
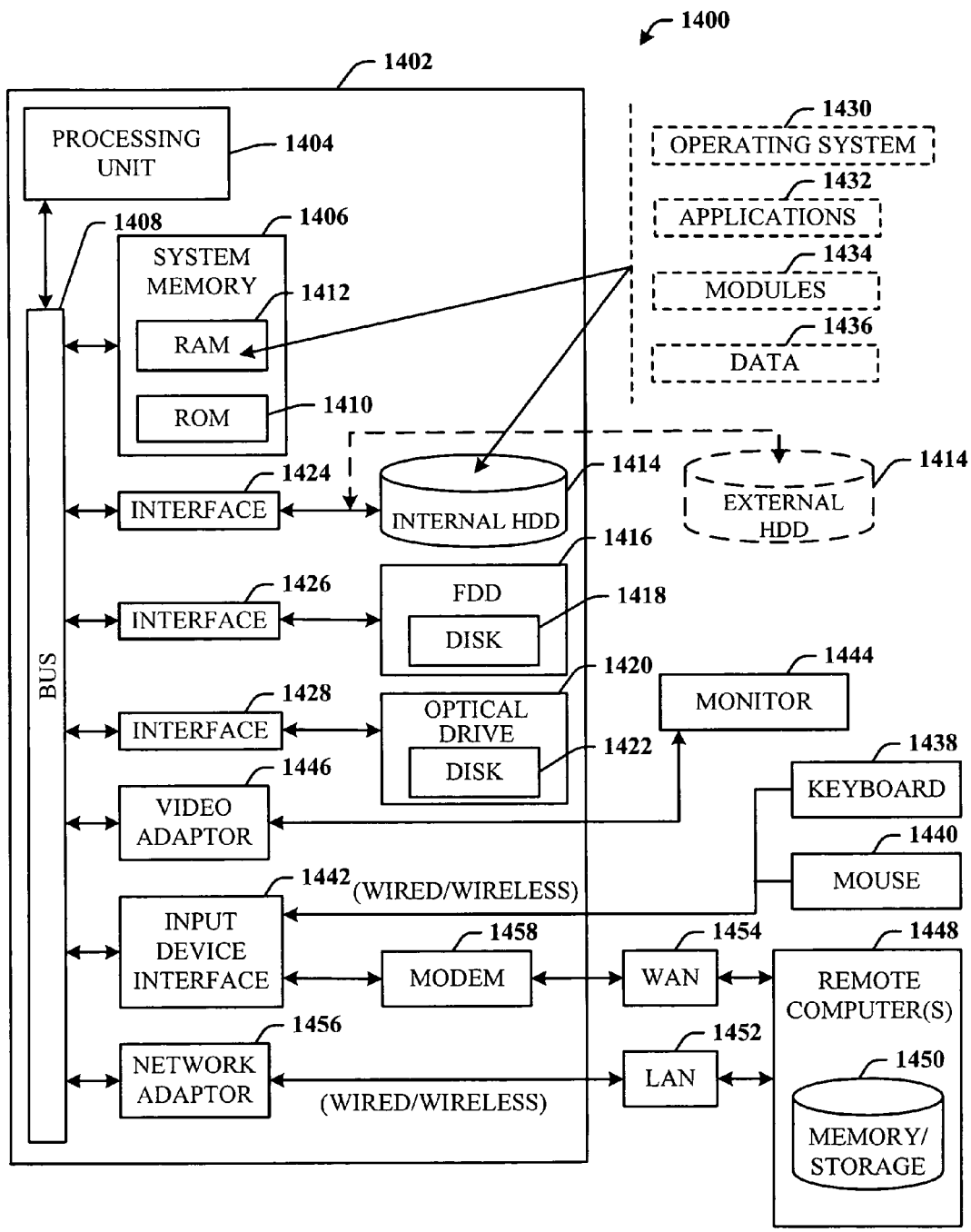
FIG. 14 illustrates a block diagram of a computer operable to provide storage and access such as for a service manager.

Referring now to FIG. 14, there is illustrated a block diagram of a computer operable to provide storage and access such as for a service manager. In order to provide additional context for various aspects thereof, FIG. 14 and the following discussion are intended to provide a brief, general description of a suitable computing environment 1400 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the exemplary environment 1400 for implementing various aspects includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as a DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
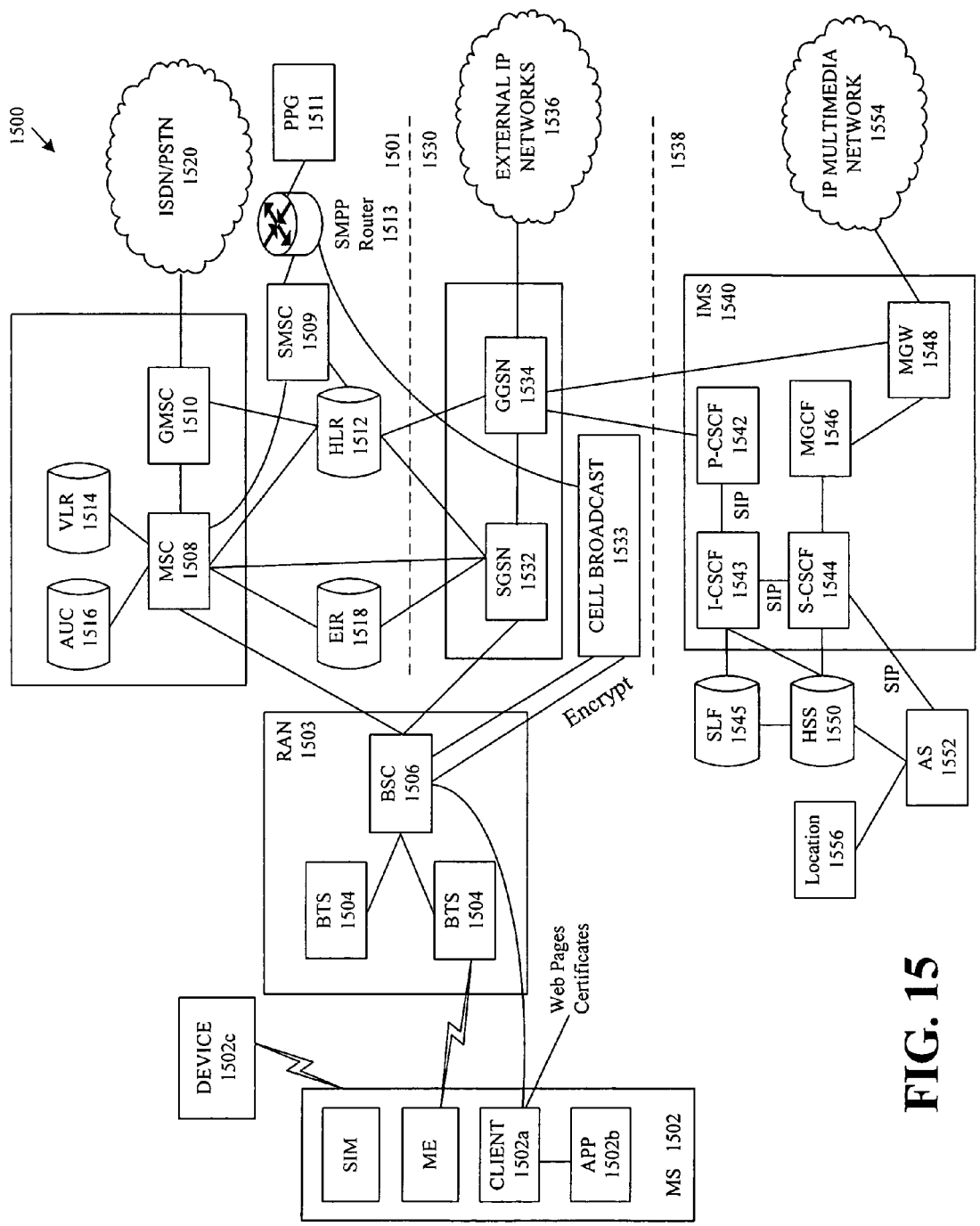
FIG. 15 illustrates an exemplary network architecture that can be employed in connection with various aspects associated with the claimed subject matter.

Now turning to FIG. 15, such figure depicts a GSM/GPRS/IP multimedia network architecture 1500 that includes a GSM core network 1501, a GPRS network 1530 and an IP multimedia network 1538. The GSM core network 1501 includes a Mobile Station (MS) 1502, at least one Base Transceiver Station (BTS) 1504 and a Base Station Controller (BSC) 1506. The MS 1502 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1502 includes an embedded client 1502a that receives and processes messages received by the MS 1502. The embedded client 1502a may be implemented in JAVA and is discuss more fully below.

The embedded client 1502a communicates with an application 1502b that provides services and/or information to an end user. One example of the application may be navigation software that provides near real-time traffic information that is received via the embedded client 1502a to the end user. The navigation software may provide road conditions, suggest alternate routes, etc. based on the location of the MS 1502. Those of ordinary skill in the art understand that there are many different methods and systems of locating an MS 1502.

Alternatively, the MS 1502 and a device 1502c may be enabled to communicate via a short-range wireless communication link, such as BLUETOOTH. For example, a BLUETOOTH SIM Access Profile may be provided in an automobile (e.g., device 1502c) that communicates with the SIM in the MS 1502 to enable the automobile's communications system to pull information from the MS 1502. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1502c. There may be an endless number of devices 1502c that use the SIM within the MS 1502 to provide services, information, data, audio, video, etc. to end users.

The BTS 1504 is physical equipment, such as a radio tower, that enables a radio interface to communicate with the MS. Each BTS may serve more than one MS. The BSC 1506 manages radio resources, including the BTS. The BSC may be connected to several BTSs. The BSC and BTS components, in combination, are generally referred to as a base station (BSS) or radio access network (RAN) 1503.

The GSM core network 1501 also includes a Mobile Switching Center (MSC) 1508, a Gateway Mobile Switching Center (GMSC) 1510, a Home Location Register (HLR) 1512, Visitor Location Register (VLR) 1514, an Authentication Center (AuC) 1516, and an Equipment Identity Register (EIR) 1518. The MSC 1508 performs a switching function for the network. The MSC also performs other functions, such as registration, authentication, location updating, handovers, and call routing. The GMSC 1510 provides a gateway between the GSM network and other networks, such as an Integrated Services Digital Network (ISDN) or Public Switched Telephone Networks (PSTNs) 1520. In other words, the GMSC 1510 provides interworking functionality with external networks.

The HLR 1512 is a database that contains administrative information regarding each subscriber registered in a corresponding GSM network. The HLR 1512 also contains the current location of each MS. The VLR 1514 is a database that contains selected administrative information from the HLR 1512. The VLR contains information necessary for call control and provision of subscribed services for each MS currently located in a geographical area controlled by the VLR. The HLR 1512 and the VLR 1514, together with the MSC 1508, provide the call routing and roaming capabilities of GSM. The AuC 1516 provides the parameters needed for authentication and encryption functions. Such parameters allow verification of a subscriber's identity. The EIR 1518 stores security-sensitive information about the mobile equipment.

A Short Message Service Center (SMSC) 1509 allows one-to-one Short Message Service (SMS) messages to be sent to/from the MS 1502. A Push Proxy Gateway (PPG) 1511 is used to "push" (e.g., send without a synchronous request) content to the MS 1502. The PPG 1511 acts as a proxy between wired and wireless networks to facilitate pushing of data to the MS 1502. A Short Message Peer to Peer (SMPP) protocol router 1513 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1502 sends a location update including its current location information to the MSCNLR, via the BTS 1504 and the BSC 1506. The location information is then sent to the MS's HLR. The HLR is updated with the location information received from the MSCNLR. The location update also is performed when the MS moves to a new location area. Typically, the location update is periodically performed to update the database as location updating events occur.

The GPRS network 1530 is logically implemented on the GSM core network architecture by introducing two packet-switching network nodes, a serving GPRS support node (SGSN) 1532, a cell broadcast and a Gateway GPRS support node (GGSN) 1534. The SGSN 1532 is at the same hierarchical level as the MSC 1508 in the GSM network. The SGSN controls the connection between the GPRS network and the MS 1502. The SGSN also keeps track of individual MS's locations and security functions and access controls.

A Cell Broadcast Center (CBC) 1533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1534 provides a gateway between the GPRS network and a public packet network (PDN) or other IP networks 1536. That is, the GGSN provides interworking functionality with external networks, and sets up a logical link to the MS through the SGSN. When packet-switched data leaves the GPRS network, it is transferred to an external TCP-IP network 1536, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1538 was introduced with 3GPP Release 5, and includes an IP multimedia subsystem (IMS) 1540 to provide rich multimedia services to end users. A representative set of the network entities within the IMS 1540 are a call/session control function (CSCF), a media gateway control function (MGCF) 1546, a media gateway (MGW) 1548, and a master subscriber database, called a home subscriber server (HSS) 1550. The HSS 1550 may be common to the GSM network 1501, the GPRS network 1530 as well as the IP multimedia network 1538.

The IP multimedia system 1540 is built around the call/session control function, of which there are three types: an interrogating CSCF (I-CSCF) 1543, a proxy CSCF (P-CSCF) 1542, and a serving CSCF (S-CSCF) 1544. The P-CSCF 1542 is the MS's first point of contact with the IMS 1540. The P-CSCF 1542 forwards session initiation protocol (SIP) messages received from the MS to an SIP server in a home network (and vice versa) of the MS. The P-CSCF 1542 may also modify an outgoing request according to a set of rules defined by the network operator (for example, address analysis and potential modification).

The I-CSCF 1543 forms an entrance to a home network and hides the inner topology of the home network from other networks and provides flexibility for selecting an S-CSCF. The I-CSCF 1543 may contact a subscriber location function (SLF) 1545 to determine which HSS 1550 to use for the particular subscriber, if multiple HSS's 1550 are present. The S-CSCF 1544 performs the session control services for the MS 1502. This includes routing originating sessions to external networks and routing terminating sessions to visited networks. The S-CSCF 1544 also decides whether an application server (AS) 1552 is required to receive information on an incoming SIP session request to ensure appropriate service handling. This decision is based on information received from the HSS 1550 (or other sources, such as an application server 1552). The AS 1552 also communicates to a location server 1556 (e.g., a Gateway Mobile Location Center (GMLC)) that provides a position (e.g., latitude/longitude coordinates) of the MS 1502.

The HSS 1550 contains a subscriber profile and keeps track of which core network node is currently handling the subscriber. It also supports subscriber authentication and authorization functions (AAA). In networks with more than one HSS 1550, a subscriber location function provides information on the HSS 1550 that contains the profile of a given subscriber.

The MGCF 1546 provides interworking functionality between SIP session control signaling from the IMS 1540 and ISUP/BICC call control signaling from the external GSTN networks (not shown). It also controls the media gateway (MGW) 1548 that provides user-plane interworking functionality (e.g., converting between AMR- and PCM-coded voice). The MGW 1548 also communicates with other IP multimedia networks 1554.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

APPENDIX A

```
################################################################
# This properties file is used by ServiceManagerConfig class. This file contains the
# details about the max no of threads per service, max thread duration, max no of hung
# threads and also to check external sources for the services status or not
################################################################
# (REQUIRED VALUE) Default maximum no of threads allowed per service
# DEFAULT_MAX_THREADS_PER_SERVICE=20
################################################################
# (REQUIRED VALUE) Maximum threads set up for the instance(JVM).
# MAX_THREADS_PER_INSTANCE=150
################################################################
# (REQUIRED VALUE) Default duration in which max no of threads allowed to hung.
# DEFAULT_TIME_OUT_DURATION=60000
################################################################
# (REQUIRED VALUE) Default maximum no of hung threads allowed per service
# DEFAULT_MAX_NO_OF_HUNG_THREADS=20
################################################################
# (REQUIRED VALUE) To indicate that the Services status should be obtained at the
# startup from other sources (App server, Files, Sockets or DB) and also propagate when
# a service status changes
# CHECK_OTHER_RESOURCES=false
################################################################
# (REQUIRED VALUE) default maximum duration allowed for a thread.
# DEFAULT_THREAD_MAX_DURATION=20000
################################################################
# (REQUIRED VALUE) To indicate for each and every status check, Get the values
# from external source (App server, Files, Sockets or DB) or not
# CHECK_OTHER_RESOURCES_ALWAYS=false
################################################################
# (REQUIRED VALUE) Mention the helper class name that is used to get values from
# the external sources (App server, Files, Sockets or DB)
# HELPER_CLASS=com.cingular.svcmgr.helper.ServiceManagerDefaultHelper
################################################################
# (OPTINAL VALUES) To Specify Max no of threads for a service. For example to set
# Max no of threads for service "test"
# MAX_THREAD_FOR_Test=4
# for service "Test1"
# MAX_THREAD_FOR_Test1=4
# MAX_THREAD_FOR_CAMOWN=60
################################################################
# (OPTINAL VALUES) To Specify Max no of hung threads for a service. For example
# to set Max no of threads for service "test"
# MAX_NO_OF_HUNG_THREADS_FOR_Test=4
# for service "Test1"
# MAX_NO_OF_HUNG_THREADS_FOR_Test1=4
# MAX_NO_OF_HUNG_THREADS_FOR_CAMOWN=75
################################################################
# (OPTINAL VALUES) To Specify Max duration of thread for a service. For example
# to set Max thread duration or service "QUICKPAY"
# THREAD_MAX_DURATION_ FOR_ QUICKPAY=35000
# for service "SNOOPER"
# THREAD_MAX_DURATION_FOR_SNOOPER=28000
THREAD_MAX_DURATION_FOR_QUICKPAY=35000
THREAD_MAX_DURATION_FOR_SNOOPER=35000
################################################################
# Default duration in which max no of threads allowed to hung.
# (OPTINAL VALUES) To Specify Max duration in which max no of threads allowed
# for a service.
# For example to set Max no of threads for service "QUICKPAY"
# TIME_OUT_DURATION_FOR_QUICKPAY=35000
# for service "SNOOPER"
# TIME_OUT_DURATION_FOR_SNOOPER=35000
# TIME_OUT_DURATION_FOR_QUICKPAY=35000
################################################################
```

What is claimed is:

1. A system, comprising:
at least one memory storing computer-executable instructions; and
at least one processor, communicatively coupled to the at least one memory, that facilitates execution of the computer-executable instructions to at least:
determine a first number of requests for a service associated with an object of a computing device communicatively coupled as an intermediary between a first computing system and a second computing system, wherein the requests are waiting for respective responses; and
in response to detection of an increase in volume of the requests for the service and in response to detection of a response time of the first computing system meeting a criterion based on a predetermined period of time, modify a parameter defining a second number of the requests for the service that are acceptable by the service.

2. The system of claim 1, wherein the at least one processor further facilitates the execution of the computer-executable instructions to reject at least one of the requests in response to a likelihood of failure of the request meeting a condition.

3. The system of claim 1, wherein the at least one processor further facilitates the execution of the computer-executable instructions to reject at least one of the requests based on a condition.

4. The system of claim 1, wherein the at least one processor further facilitates the execution of the computer-executable instructions to determine a responsiveness of a billing system associated with the middleware tier.

5. The system of claim 1, wherein the at least one processor further facilitates the execution of the computer-executable instructions to assess a quantity of resources of the computing device consumed by an other service that is associated with a billing system to facilitate a determination of acceptance of at least one of the requests.

6. The system of claim 5, wherein the at least one processor further facilitates the execution of the computer-executable instructions to determine the quantity of the resources based on a threshold for a third number of requests, for the service that is associated with the billing system, that are acceptable for execution.

7. The system of claim 1, wherein the at least one processor further facilitates the execution of the computer-executable instructions to determine available resources associated with the object of the application.

8. The system of claim 7, wherein the object is a run-time object.

9. The system of claim 8, wherein at least one of the requests associates an application programming interface with the run-time object.

10. The system of claim 7, wherein the at least one processor further facilitates the execution of the computer-executable instructions to determine that the second number of requests associated with the object of the application that are acceptable for execution.

11. The system of claim 7, wherein the at least one processor further facilitates the execution of the computer-executable instructions to determine the available resources based on a threshold for a third number of requests that are acceptable for execution.

12. The system of claim 1, wherein the at least one processor further facilitates the execution of the computer-executable instructions to differentiate between a billing system associated with a degraded response time and the increase in volume of the requests.

13. The system of claim 12, wherein the at least one processor further facilitates the execution of the computer-executable instructions to reject at least one of the requests in response to detection of a response time of the billing system satisfying another criterion based on another predetermined period of time.

14. The system of claim 1, wherein the at least one processor further facilitates the execution of the computer-executable instructions to vary acceptance of a third number of requests associated with a billing system coupled to the computing device that are concurrently executing.

15. The system of claim 1, wherein the at least one processor further facilitates the execution of the computer-executable instructions to allocate resources between services including the service.

16. The system of claim 1, wherein the at least one processor further facilitates the execution of the computer-executable instructions to provide notification of a rejection of at least one of the requests, wherein the rejection is directed to a client device associated with the request.

17. The system of claim 1, wherein the at least one processor further facilitates the execution of the computer-executable instructions to reject at least one of the requests in response to a service of a billing system coupled to the computing device operating without satisfying predetermined performance metrics.

18. The system of claim 17, wherein the predetermined performance metrics are associated with failure of resources associated with the computing device.

19. The system of claim 1, wherein the server is configured to broker data transmissions between a client device and a billing system that is coupled to the computing device.

20. The system of claim 1, wherein the application is associated with respective functions.

21. The system of claim 1, wherein the object is a run-time object.

22. The system of claim 1, wherein the at least one processor further facilitates the execution of the computer-executable instructions to accept at least one of the requests based on the parameter.

23. A system, comprising:
at least one memory storing computer-executable instructions; and
at least one processor, communicatively coupled to the at least one memory, that facilitates execution of the computer-executable instructions to at least:
determine a quantity of requests for a service that are waiting for respective responses associated with an object of an application of a computing device communicatively coupled as an intermediary between a first computing system and a second computing system; and
increase a value that indicates a number of the requests for the service that are acceptable by the service in response to detection of a response time of the first computing system not being greater than a predetermined period of time and in response to an increase in the quantity of the requests for the service.

24. The system of claim 23, wherein the computing device is configured to provide an extensible markup language interface to a resource associated with a billing system.

25. The system of claim 23, wherein the requests include a synchronous request.

26. The system of claim 23, wherein the at least one processor further facilitates the execution of the computer-executable instructions to identify a billing system associated with at least one of the requests.

27. The system of claim 23, wherein the at least one processor further facilitates the execution of the computer-executable instructions to reject at least one of the requests and direct a response to a device associated with the at least one of the requests.

28. The system of claim 23, wherein the at least one processor further facilitates the execution of the computer-executable instructions to identify resources that are being employed to process different requests.

29. The system of claim 23, wherein the at least one processor further facilitates the execution of the computer-executable instructions to identify resources associated with at least one of the requests.

30. The system of claim 23, wherein the at least one processor further facilitates the execution of the computer-executable instructions to facilitate access to a status of a service manager component, and control an operation of the service manager component.

31. A method, comprising:
receiving, by a processor based device, a request from a first device;

identifying, by the processor based device based on the request, a quantity of requests for a service associated with an object of an application of a computing device communicatively coupled as an intermediary between a first system and a second system, wherein the requests are waiting for respective responses; and in response to detecting an increase in the quantity of the requests for the service and detecting a response time of the first system meeting a condition with respect to a predetermined period of time, increasing, by the processor based device, an amount of the requests being accepted.

32. The method of claim 31, further comprising providing, by the processor based device, notification of a rejection of the request directed to the first device.

33. The method of claim 32, wherein the providing further comprises providing, by the processor based device, the notification based on a condition.

34. The method of claim 31, further comprising:
accepting, by the processor based device, the request in response to determining the request is to be accepted; and
processing, by the processor based device, the request.

35. The method of claim 31, further comprising:
rejecting, by the processor based device, the request in response to a number of requests for a resource associated with the request being greater than a predetermined number of requests related to the resource.

36. The method of claim 31, further comprising:
rejecting, by the processor based device, the request in response to a number of requests associated with the object being greater than a predetermined number of requests for the object.

37. The method of claim 31, further comprising:
determining, by the processor based device, a number of requests currently being processed;
increasing, by the processor based device, the number of requests in response to accepting, by the processor based device, the request; and
decreasing, by the processor based device, the number of requests in response to receiving a response to the request.

38. A non-transitory computer readable storage medium comprising computer executable instructions that, in response to execution, cause a computing system including at least one processor to perform operations, comprising:
receiving requests for a service associated with an object of an application of a computing device communicatively coupled as an intermediary between an other computing device and respective clients;
evaluating a quantity of the requests that are waiting for respective responses; and
in response to detecting an increase in the quantity of the requests and detecting a response time of the other computing device satisfying a function of a predetermined period of time, increasing a maximum number of the requests for the service being accepted.

39. The system of claim 1, wherein the at least one processor further facilitates the execution of the computer-executable instructions to perform administration of wireless communication between devices.

40. The system of claim 39, wherein the at least one processor further facilitates the execution of the computer-executable instructions to utilize different services for different predefined markets associated with different client devices.

* * * * *